(12) United States Patent
Imamura et al.

(10) Patent No.: US 10,836,075 B2
(45) Date of Patent: Nov. 17, 2020

(54) FLOW SPEED CONTROL PLATE

(71) Applicant: DENSO CORPORATION, Kariya (JP)

(72) Inventors: Suguru Imamura, Kariya (JP); Naohiro Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 71 days.

(21) Appl. No.: 15/987,153

(22) Filed: May 23, 2018

(65) Prior Publication Data
US 2018/0339427 A1    Nov. 29, 2018

(30) Foreign Application Priority Data

May 25, 2017   (JP) ................................. 2017-103752

(51) Int. Cl.
| B29C 48/11 | (2019.01) |
| B28B 3/26 | (2006.01) |
| B30B 11/22 | (2006.01) |
| B29C 48/00 | (2019.01) |
| B28B 3/20 | (2006.01) |

(52) U.S. Cl.
CPC ............ B28B 3/2672 (2013.01); B28B 3/269 (2013.01); B29C 48/0022 (2019.02); B29C 48/022 (2019.02); B29C 48/11 (2019.02); B30B 11/221 (2013.01); *B28B 2003/203* (2013.01)

(58) Field of Classification Search
CPC . B28B 3/2672; B28B 3/269; B28B 2003/203; B28B 7/0032; B28B 7/02; B29C 48/0022; B29C 48/11; B29C 48/03; B29C 48/15; B29C 48/16; B29C 48/25; B30B 11/221; B22F 3/22

See application file for complete search history.

(56) References Cited

U.S. PATENT DOCUMENTS 4,128,372 A * 12/1978 Rose ........................ A21C 3/04
                                                                     425/311
4,687,433 A     8/1987 Ozaki et al.
(Continued)

FOREIGN PATENT DOCUMENTS

| JP | H9-141629 | 6/1997 |
| JP | 2008-149595 | 7/2008 |
| JP | 2010188611 A * 9/2010 | ............ B28B 3/269 |

OTHER PUBLICATIONS

Machine Translation of JP2010188611. (Year: 2010).*

*Primary Examiner* — Jacob T Minskey
*Assistant Examiner* — Adrien J Bernard
(74) *Attorney, Agent, or Firm* — Nixon & Vanderhye P.C.

(57) ABSTRACT

A flow speed control plate is provided for use in combination with a die for forming a monolith. The flow speed control plate includes: a base plate having both a clay supply surface and a clay outflow surface that is to be superposed on a clay inflow surface of the die; clay flow holes which each penetrate the base plate and through which the clay flows from the clay supply surface to the clay outflow surface; and a positioning mechanism provided to position the flow speed control plate with respect to the die so that each of the clay flow holes of the flow speed control plate has its central axis arranged coaxially with a central axis of a corresponding one of clay inflow holes of the die. Moreover, a diameter of the clay flow holes is set to be smaller than a diameter of the corresponding clay inflow holes.

10 Claims, 14 Drawing Sheets

(56) References Cited

U.S. PATENT DOCUMENTS

| | | | | |
|---|---|---|---|---|
| 5,219,509 | A * | 6/1993 | Cocchetto | B28B 3/269 |
| | | | | 264/177.12 |
| 6,039,908 | A * | 3/2000 | Brew | B28B 3/2672 |
| | | | | 264/177.12 |
| 2010/0209546 | A1 | 8/2010 | Hayashi et al. | |
| 2013/0099412 | A1 * | 4/2013 | Komori | B29D 99/0089 |
| | | | | 264/177.12 |
| 2013/0200542 | A1 * | 8/2013 | Yoshino | B28B 3/206 |
| | | | | 264/39 |
| 2015/0137431 | A1 * | 5/2015 | Hayashi | C04B 35/195 |
| | | | | 264/630 |
| 2018/0043596 | A1 * | 2/2018 | Imaizumi | B28B 3/269 |

\* cited by examiner

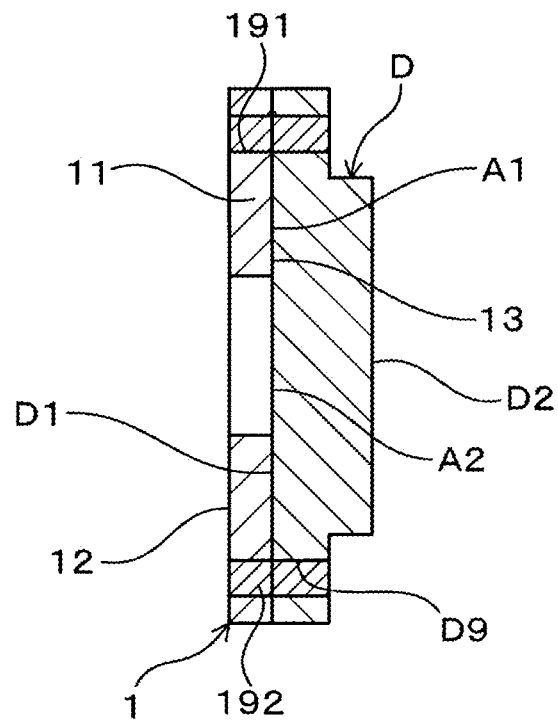

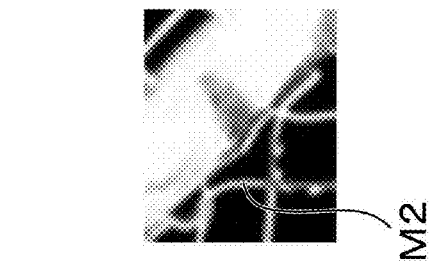
FIG.14D
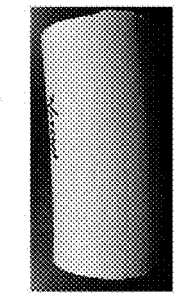
FIG.14C
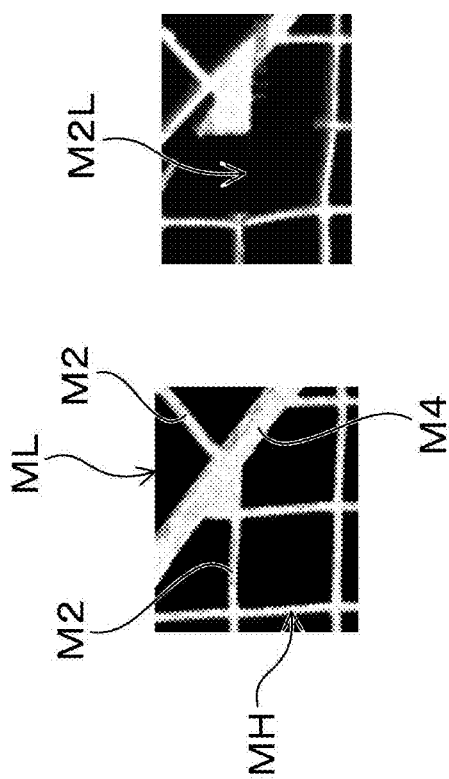
FIG.14B
FIG.14A

FLOW SPEED CONTROL PLATE

CROSS-REFERENCE TO RELATED APPLICATION

This application is based on and claims priority from Japanese Patent Application No. 2017-103752 filed on May 25, 2017, the content of which is hereby incorporated by reference in its entirety into this application.

BACKGROUND

1 Technical Field

The present invention relates to a flow speed control plate for use in combination with a die for forming a monolith.

2 Description of Related Art

There are known monolithic substrates (or monolithic catalyst supports) which are formed of a ceramic such as cordierite. The monolithic substrates include, for example, a tubular outer skin, lattice-like cell walls partitioning the inside of the outer skin and cells surrounded by the cell walls. Moreover, the monolithic substrates support noble metal catalysts such as Pt, Rh and Pd, thereby performing the function of purifying exhaust gas through oxidation reduction of NOx, HC and CO in the exhaust gas. In addition, there are known both those monolithic substrates where the cell density inside the outer skin is constant and those monolithic substrates where the cell density is varied in a direction perpendicular to the axial direction thereof to enhance the purification performance.

The monolithic substrates are generally manufactured by extrusion using a die. The die includes a number of clay inflow holes each extending from a clay inflow surface of the die in an extrusion direction and lattice-like grooves (or slits) that communicate with the clay inflow holes and open on an extrusion surface of the die.

For example, in the case of manufacturing a monolithic substrate having both a low-cell-density region and a high-cell-density region, a die used for forming the monolithic substrate includes both the grooves for forming the low-cell-density region and the grooves for forming the high-cell-density region. However, in such a die, it is easy for the flow speed of the clay in the grooves for forming the low-cell-density region and the flow speed of the clay in the grooves for forming the high-cell-density region to become different from each other.

Specifically, it is easy for the flow speed of the clay to become relatively high in the grooves for forming the low-cell-density region and relatively low in the grooves for forming the high-cell-density region. Consequently, the flow speed of the clay becomes uneven in the die so that formation defects may occur in the resultant monolithic substrate. The formation defects include, for example, a formation defect where the cells are collapsed, a formation defect where the cell walls are imperfectly formed and a formation defect where the monolithic substrate is warped (e.g., bent or twisted).

To solve the above problem, Japanese Patent Application Publication No. JP2010188611A discloses a back plate (or flow speed control plate) designed to be used in contact with the clay inflow surface of a die. The back plate includes a number of clay flow holes each of which is formed so as to be coaxial with a corresponding one of the clay inflow holes of the die. With the back plate arranged on the clay inflow surface of the die, the flow speed of the clay in the grooves for forming the low-cell-density region is suppressed.

Consequently, the flow speed of the clay may be equalized in the die.

However, the inventors of the present application have found the following problems with the back plate disclosed in the above patent document.

That is, when positional misalignment occurs between the clay flow holes of the back plate and the corresponding clay inflow holes of the die and thus the clay flowing out of the clay flow holes of the back plate interferes with the die, it becomes difficult for the clay to flow into the corresponding clay inflow holes of the die. Consequently, the flow speed of the clay becomes uneven in the die.

Moreover, a positioning mechanism may be employed to position the back plate with respect to the die. However, even in this case, positional misalignment may occur between the clay flow holes of the back plate and the corresponding clay inflow holes of the die when at least one of the back plate and the die is deformed due to the clay flowing thereinto. Furthermore, positional misalignment may occur between the clay flow holes of the back plate and the corresponding clay inflow holes of the die also when the machining accuracy of the holes of the die and the back plate is low. Consequently, due to the positional misalignment, the clay flowing out of the clay flow holes of the back plate might interfere with the die. In addition, interference of the clay flowing out of the clay flow holes of the back plate with the die might occur in a relatively early stage of forming the monolithic substrate using the die and the back plate. As a result, due to the interference, the flow speed of the clay would become uneven in the die, so that the aforementioned formation defects might occur in the resultant monolithic substrate.

SUMMARY

According to exemplary embodiments, there is provided a flow speed control plate for use in combination with a die for forming a monolith. The die has both a clay inflow surface on which a plurality of clay inflow holes open and an extrusion surface on which lattice-like grooves open. The lattice-like grooves communicate with the clay inflow holes in the die. The flow speed control plate includes: a base plate having both a clay supply surface from which a clay is supplied to the flow speed control plate and a clay outflow surface which is configured to be superposed on the clay inflow surface of the die and from which the clay flows out of the flow speed control plate; a plurality of clay flow holes which each penetrate the base plate in a thickness direction of the base plate and through which the clay flows from the clay supply surface to the clay outflow surface; and a positioning mechanism provided to position the flow speed control plate with respect to the die so that each of the clay flow holes of the flow speed control plate has its central axis arranged coaxially with a central axis of a corresponding one of the clay inflow holes of the die. Moreover, a diameter of the clay flow holes of the flow speed control plate on the clay outflow surface of the base plate is set to be smaller than a diameter of the corresponding clay inflow holes of the die on the clay inflow surface of the die.

With the above configuration, when at least one of the flow speed control plate and the die is deformed due to the clay flowing thereinto and thus positional misalignment occurs between the clay flow holes of the flow speed control plate and the corresponding clay inflow holes of the die, it is still possible to prevent the clay flowing out of the clay flow holes of the flow speed control plate from interfering with the die. Moreover, when the machining accuracy of the clay flow holes and the clay inflow holes is low and thus positional misalignment occurs between the clay flow holes and the corresponding clay inflow holes, it is still possible to prevent the clay flowing out of the clay flow holes of the flow speed control plate from interfering with the die. As a result, it is possible to prevent the clay flow holes and the clay inflow holes from becoming small at the boundaries therebetween due to the aforementioned interference, thereby preventing the flow speed of the clay from becoming uneven in the die. Hence, it is possible to suppress occurrence of formation defects in the resultant monolith.

Moreover, with the above configuration, it is possible to reduce the thickness of the flow speed control plate for imposing the same resistance on the flow of the clay in comparison with the case of setting the diameter of the clay flow holes to be greater than or equal to the diameter of the corresponding clay inflow holes. Consequently, with the reduced thickness, it becomes easier for the flow speed control plate to follow the die when the clay is supplied. As a result, it becomes possible to prevent formation of a gap between the flow speed control plate and the die and thus leakage of the clay via such a gap.

Furthermore, in the case of setting the diameter of the clay flow holes of the flow speed control plate to be larger than the diameter of the corresponding clay inflow holes of the die, those portions of the die which surround the corresponding clay inflow holes on the clay inflow surface of the die may be worn when the clay flows across the boundaries between the clay flow holes of the flow speed control plate and the corresponding clay inflow holes of the die. That is, the die, which is generally expensive, may be worn down. In contrast, setting the diameter of the clay flow holes of the flow speed control plate to be smaller than the diameter of the corresponding clay inflow holes of the die, it is possible to prevent the die from being worn when the clay flows across the boundaries between the clay flow holes of the flow speed control plate and the corresponding clay inflow holes of the die.

To sum up, with the flow speed control plate provided according to the exemplary embodiments, it is possible to suppress occurrence of formation defects in the resultant monolith.

BRIEF DESCRIPTION OF THE DRAWINGS

The present invention will be understood more fully from the detailed description given hereinafter and from the accompanying drawings of exemplary embodiments, which, however, should not be taken to limit the present invention to the specific embodiments but are for the purpose of explanation and understanding only.

In the accompanying drawings:

FIG. 9 is a cross-sectional view of the die and the flow speed control plate after being assembled to each other;

FIG. 14A is a photographic representation illustrating part of the monolithic substrate without formation defects;

FIG. 14B is a photographic representation illustrating a formation defect where cell walls of the monolithic substrate are imperfectly formed;

FIG. 14C is a photographic representation illustrating a formation defect where the monolithic substrate is warped;

FIG. 14D is a photographic representation illustrating a formation defect where cells of the monolithic substrate are collapsed;

DESCRIPTION OF EMBODIMENTS

Figure 1:
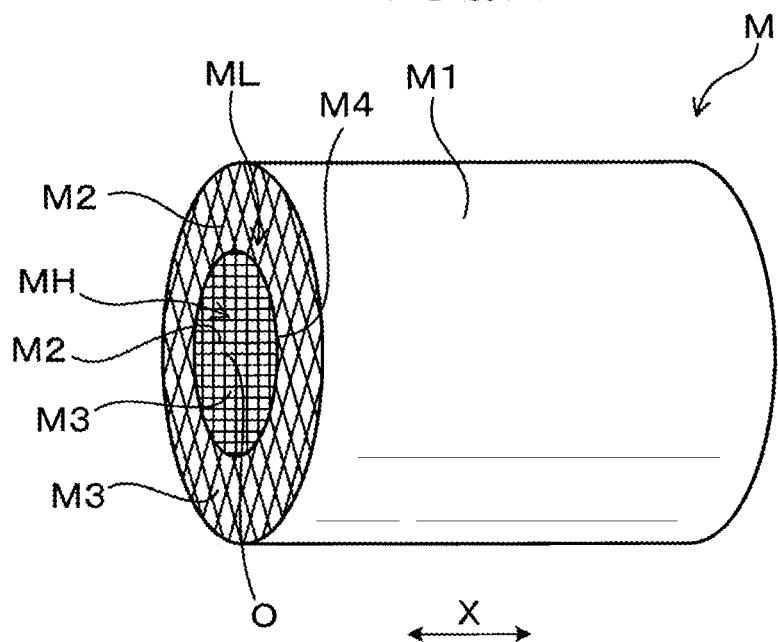
FIG. 1 is a perspective view of a monolithic substrate which is formed by extrusion using a die and a flow speed control plate according to a first embodiment.

Exemplary embodiments will be described hereinafter with reference to FIGS. 1-23. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

Figure 2:
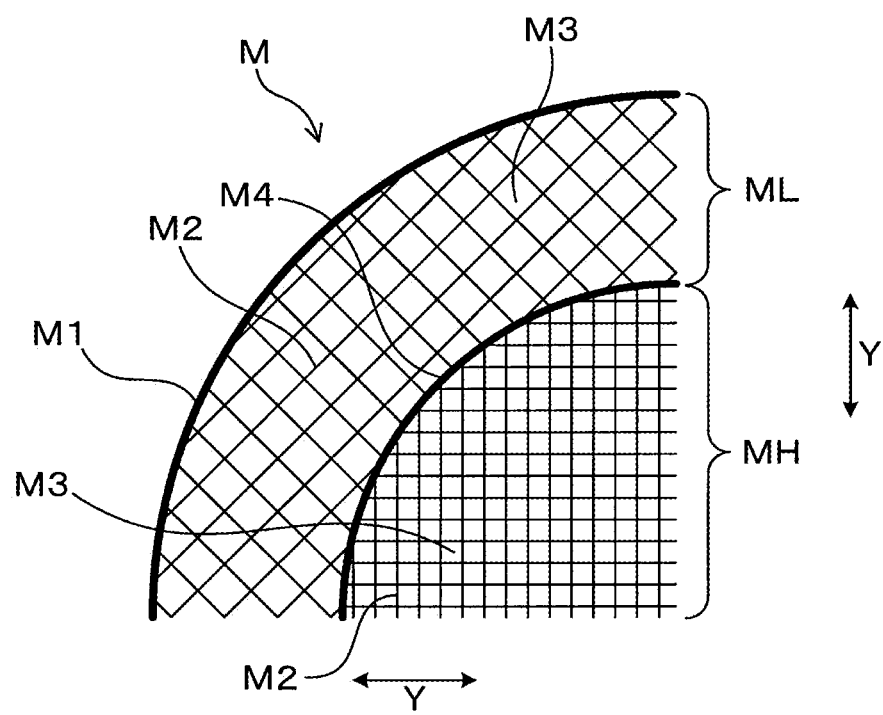
FIG. 2 is an enlarged cross-sectional view of part of the monolithic substrate.

FIGS. 1 and 2 together show the overall configuration of a monolithic substrate M which is formed by extrusion using a die D and a flow speed control plate 1 according to a first embodiment.

As shown in FIGS. 1 and 2, the monolithic substrate M includes an outer skin M1, cell walls M2 and cells M3.

The outer skin M1 has a tubular shape, more particularly a hollow cylindrical shape in the present embodiment.

In addition, the shape of the outer skin M1 is not particularly limited. For example, the outer skin M1 may alternatively have the shape of a polygonal tube such as a quadrangular tube.

The thickness of the outer skin M1 may be suitably set. For example, the thickness of the outer skin M1 may be set to be in the range of 0.1 to 1.0 mm. It is preferable to set the thickness of the outer skin M1 to be in the range of 0.15 to 0.4 mm.

In terms of enhancing the strength of the monolithic substrate M and thereby preventing damage to the monolithic substrate M during, for example, the canning of the monolithic substrate M, it is preferable to set the thickness of the outer skin M1 to be larger than the thickness of each of the cell walls M2.

The cell walls M2 are formed in a lattice-like manner to partition the inside (or the interior space) of the outer skin M1 into the cells M3.

Hereinafter, the longitudinal direction of the outer skin M1 (or the longitudinal direction of the cells M3) will be referred to as the axial direction X of the monolithic substrate M; a direction perpendicular to the axial direction X will be referred to as a radial direction Y of the monolithic substrate M. In addition, when the monolithic substrate M is used in, for example, an exhaust system of a motor vehicle, exhaust gas flows through the inside of the monolithic substrate M in the axial direction X.

The lattice-like formation of the cell walls M2 is not particularly limited. For example, as shown in FIGS. 1 and 2, in the present embodiment, the cell walls M2 are formed to each have a quadrangular cross section perpendicular to the axial direction X of the monolithic substrate M. In addition, the cell walls M2 may alternatively be formed to each have a polygonal (e.g., triangular, hexagonal or octagonal) cross section perpendicular to the axial direction X.

The cells M3 are surrounded by the lattice-like cell walls M2 and each extend in the axial direction X of the monolithic substrate M. That is, the monolithic substrate M is honeycomb-structured to include a number of cells M3.

As shown in FIGS. 1 and 2, in the present embodiment, the monolithic substrate M is formed to include a high-cell-density region MH and a low-cell-density region ML that has a lower cell density than the high-cell-density region MH.

It should be noted that the monolithic substrate M may alternatively be formed to include three or more regions having different cell densities.

The cell density is represented by, for example, the number of cells M3 per unit area. The cell density may be changed by, for example, varying the formation pitch of the cell walls M2.

In addition, those cells M3 which face the outer skin M1 or a boundary wall M4 (to be described later) of the monolithic substrate M tend to have an imperfect shape that is different from the perfect (or normal) shape of the other cells M3. Therefore, those cells M3 having the imperfect shape are not counted in calculating the cell density.

Moreover, as shown in FIGS. 1 and 2, in the present embodiment, the cell density is constant in each of the high-cell-density and low-cell-density regions MH and ML of the monolithic substrate M. The constant cell density of the high-cell-density region MH is higher than the constant cell density of the low-cell-density region ML.

The high-cell-density region MH is located at a radially central part of the monolithic substrate M which includes a central axis O of the monolithic substrate M. The low-cell-density region ML is located radially outside the high-cell-density region MH. In other words, in the radial direction Y of the monolithic substrate M, the high-cell-density region MH is located on the central axis O side while the low-cell-density region ML is located on the outer skin M1 side.

In addition, though not shown in the figures, the cell density may alternatively be varied in each of the high-cell-density and low-cell-density regions MH and ML of the monolithic substrate M. For example, the cell density may be varied so as to decrease in a radially outward direction (i.e., in the radial direction Y from the central axis O to the outer skin M1).

The thickness of the cell walls M2 in the high-cell-density region MH and the thickness of the cell walls M2 in the low-cell-density region ML may be set to be either equal to or different from each other.

It is preferable to set the thickness of the cell walls M2 in the low-cell-density region ML to be larger than the thickness of the cell walls M2 in the high-cell-density region MH. In this case, it is possible to more reliably prevent damage to the monolithic substrate M during, for example, the canning of the monolithic substrate M.

The thickness of the cell walls M2 may be set to be in the range of, for example, 0.05 to 0.2 mm. It is preferable to set the thickness of the cell walls M2 to be in the range of 0.05 to 0.12 mm.

Between the high-cell-density region MH and the low-cell-density region ML, there may be formed a boundary wall M4 to separate the two regions MH and ML from each other. For example, as shown in FIGS. 1 and 2, in the present embodiment, the monolithic substrate M has a cylindrical boundary wall M4 formed between the high-cell-density region MH and the low-cell-density region ML.

In addition, the shape of the boundary wall M4 is not particularly limited. For example, the boundary wall M4 may alternatively have the shape of a polygonal tube such as a quadrangular tube, a hexagonal tube or an octagonal tube.

The thickness of the boundary wall M4 may be set to be in the range of, for example, 0.1 to 0.5 mm. It is preferable to set the thickness of the boundary wall M4 to be in the range of 0.1 to 0.3 mm.

Moreover, in terms of enhancing the strength of the monolithic substrate M, it is preferable to set the thickness of the boundary wall M4 to be larger than the thickness of each of the cell walls M2. That is, it is preferable to set the thickness of the boundary wall M4 to be larger than both the thickness of the cell walls M2 in the high-cell-density region MH and the thickness of the cell walls M2 in the low-cell-density region ML.

The monolithic substrate M is formed of a ceramic into one piece (i.e., to be monolithic). For example, the monolithic substrate M may be formed of cordierite, SiC, aluminum titanate, alumina, ceria-zirconia, zeolite or mullite. Alternatively, the monolithic substrate M may be formed of a mixture of the aforementioned materials. In terms of securing a low coefficient of thermal expansion and a superior thermal resistance in a high-temperature environment, it is preferable for the monolithic substrate M to be formed of cordierite.

In manufacturing the monolithic substrate M that is formed of cordierite, a clay is generally used which includes raw materials of cordierite. The clay is extruded into an extrudate (or extrusion-molded body) that has a honeycomb structure. For obtaining the extrudate without formation defects, it is ideal to equalize the flow speed of the clay on a plane perpendicular to the extrusion direction during the extrusion. However, when the extrudate includes cells of different specifications, e.g., cell walls having different thicknesses, it is difficult to equalize the flow speed of the clay on the plane perpendicular to the extrusion direction during the extrusion. Therefore, in the present embodiment, the flow speed control plate 1 is used to equalize the flow speed of the clay on the plane perpendicular to the extrusion direction during the extrusion, thereby suppressing occurrence of formation defects in the resultant extrudate.

Specifically, in the present embodiment, the monolithic substrate M is manufactured by extruding the clay into the extrudate using the die D and the flow speed control plate 1 and firing the resultant extrudate.

Figure 3:
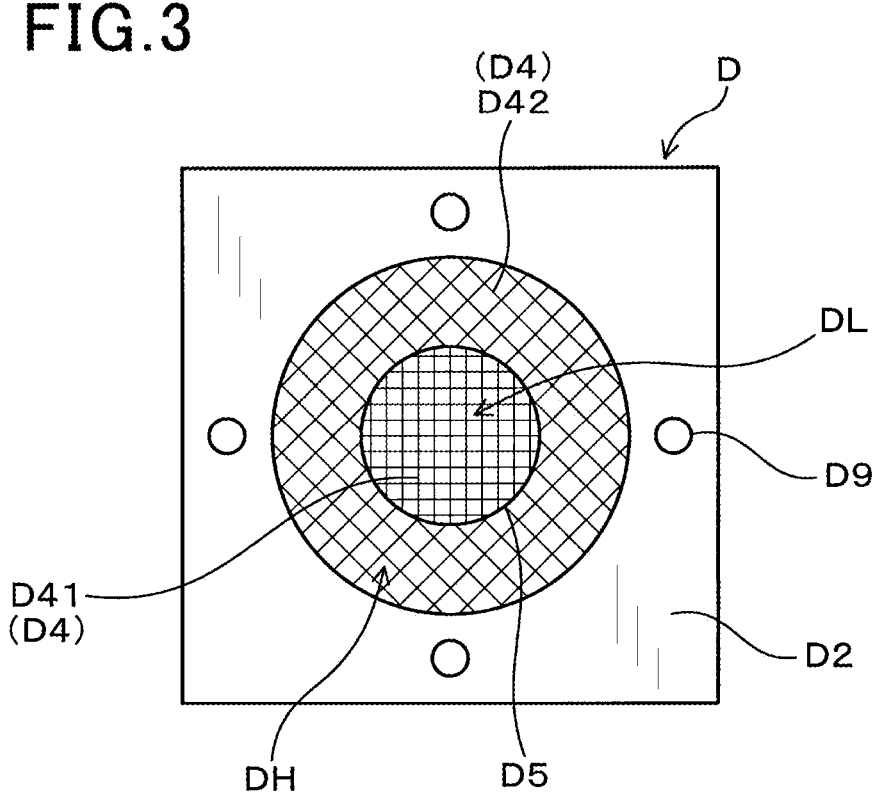
FIG. 3 is a front view of the die showing an extrusion surface of the die.
Figure 4:
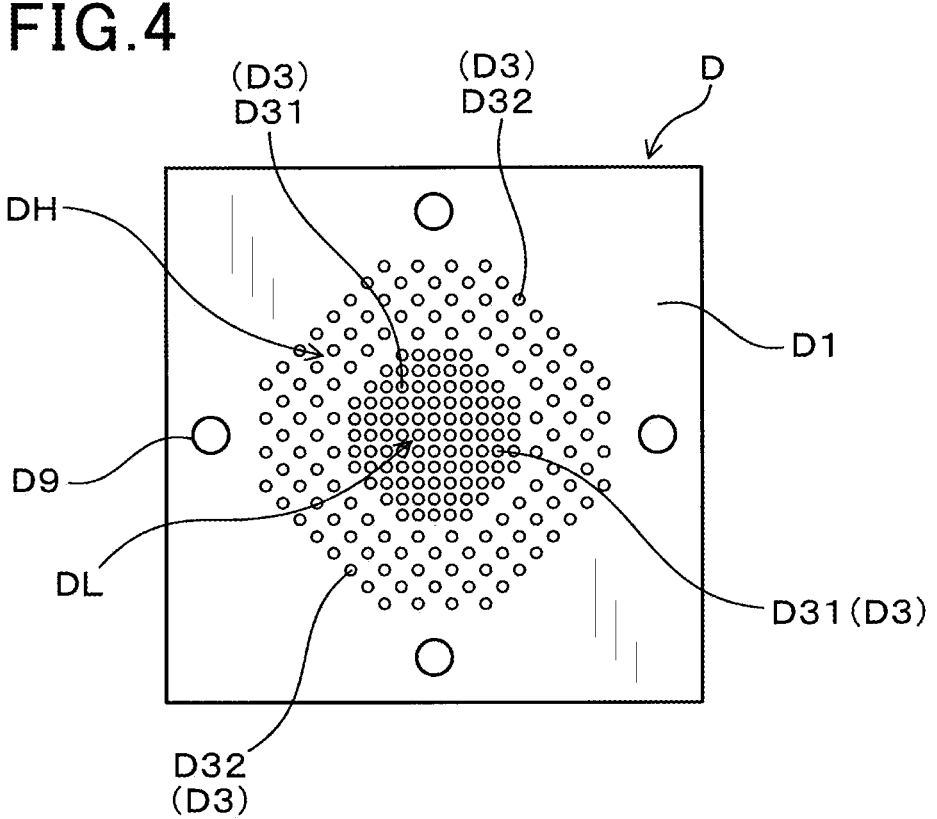
FIG. 4 is a rear view of the die showing a clay inflow surface of the die.

The die D has both an extrusion surface D2 as shown in FIG. 3 and a clay inflow surface D1 as shown in FIG. 4. The extrusion surface D2 is a surface from which the clay is extruded out of the die D into the honeycomb shape. The clay inflow surface D1 is a surface from which the clay flows into the die D. The die D is substantially plate-shaped. The clay inflow surface D1 and the extrusion surface D2 are opposite to (or face away from) each other in a thickness direction of the die D (see FIGS. 8 and 9).

Figure 5:
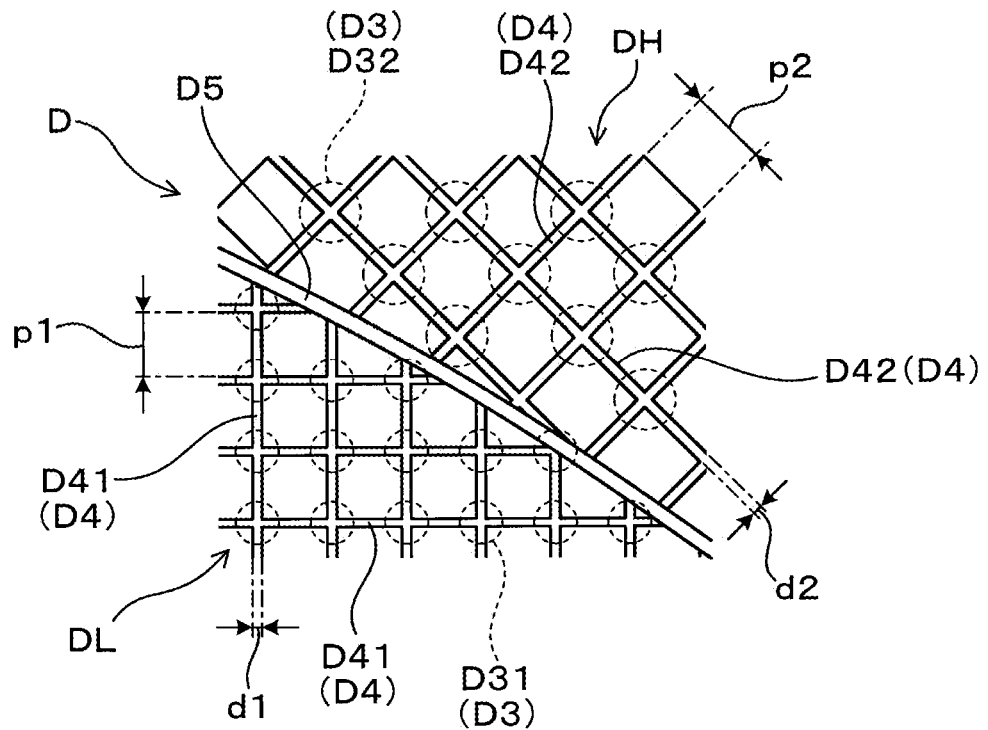
FIG. 5 is an enlarged view of part of the extrusion surface of the die.
Figure 6:
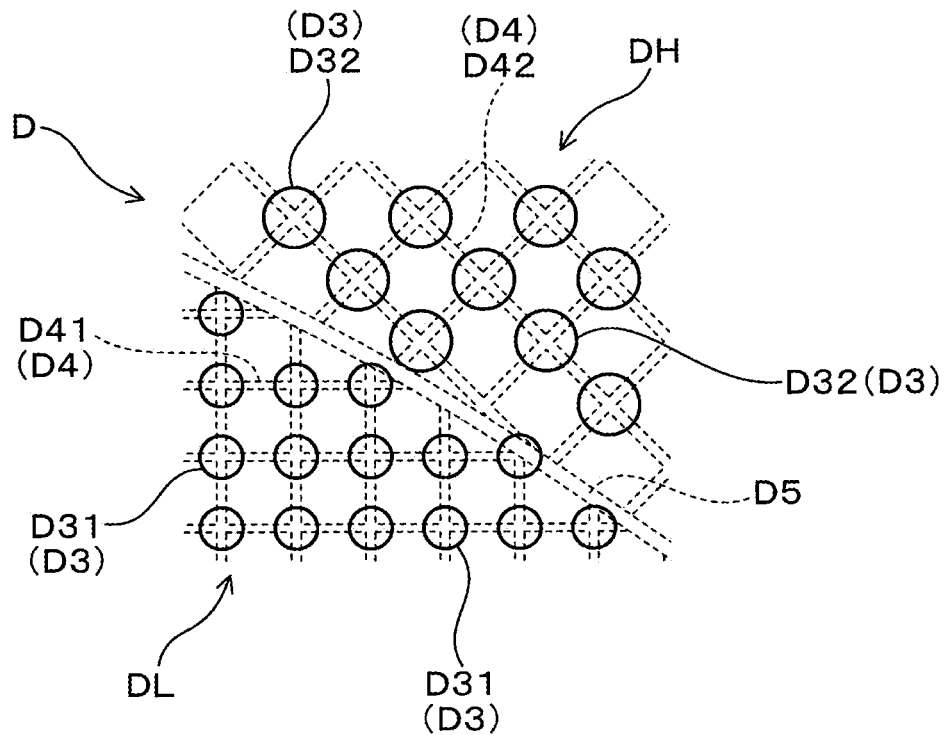
FIG. 6 is an enlarged view of part of the clay inflow surface of the die.

As shown in FIGS. 3 and 5, in the extrusion surface D2 of the die D, there are formed lattice-like grooves D4. On the other hand, as shown in FIGS. 4 and 6, in the clay inflow surface D1 of the die D, there are formed a number of clay inflow holes D3 into which the clay flows. The clay inflow holes D3 are formed, for example, at intersections between the lattice-like grooves D4. Moreover, the clay inflow holes D3 and the lattice-like grooves D4 communicate with each other in the die D. In addition, it should be noted that: the clay inflow holes D3 actually should not appear on FIG. 5 which shows the extrusion surface D2 of the die D; however, for illustrating the positional relationship of the clay inflow holes D3 with the lattice-like grooves D4, the clay inflow holes D3 are also depicted on FIG. 5 with dashed lines.

The lattice-like grooves D4 of the die D are formed so as to conform to the lattice-like cell walls M2 of the monolithic substrate M. That is, the cell walls M2 of the monolithic substrate M are formed of the clay extruded from the lattice-like grooves D4 of the die D.

In the present embodiment, the die D includes both a low-flow-speed region DL where the flow speed of the clay inside the die D is relatively low and a high-flow-speed region DH where the flow speed of the clay inside the die D is relatively high. In the low-flow-speed region DL, there are formed the lattice-like grooves D4 for forming the cell walls M2 in the high-cell-density region MH of the monolithic substrate M. On the other hand, in the high-flow-speed region DH, there are formed the lattice-like grooves D4 for forming the cell walls M2 in the low-cell-density region ML of the monolithic substrate M. Hereinafter, for the sake of convenience of explanation, the lattice-like grooves D4 formed in the low-flow-speed region DL will be referred to as first lattice-like grooves D41 whereas the lattice-like grooves D4 formed in the high-flow-speed region DH will be referred to second lattice-like grooves D42.

That is, the first lattice-like grooves D41 are grooves for forming the cell walls M2 with a narrow cell pitch in the high-cell-density region MH of the monolithic substrate M, whereas the second lattice-like grooves D42 are grooves for forming the cell walls M2 with a wide cell pitch in the low-cell-density region ML of the monolithic substrate M. As shown in FIG. 5, a pitch width (or lattice interval) $p_1$ of the first lattice-like grooves D41 is set to be, for example, smaller than a pitch width (or lattice interval) $p_2$ of the second lattice-like grooves D42. Moreover, a groove width $d_1$ of the first lattice-like grooves D41 is set to be, for example, smaller than a groove width $d_2$ of the second lattice-like grooves D42.

In the extrusion surface D2 of the die D, there is also formed a tubular groove D5 between the low-flow-speed region DL and the high-flow-speed region DH so as to open on the extrusion surface D2. The tubular groove D5 separates the low-flow-speed region DL and the high-flow-speed region DH from each other. The tubular groove D5 is a groove for forming the cylindrical boundary wall M4 of the monolithic substrate M shown in FIGS. 1 and 2.

As shown in FIGS. 4 and 6, in the clay inflow surface D1 of the die D, there are formed a number of clay inflow holes D3. Each of the clay inflow holes D3 extends from the clay inflow surface D1 in the thickness direction of the die D to have a predetermined depth in the thickness direction. The clay inflow holes D3 communicate with the lattice-like grooves D4 in the die D and open on the clay inflow surface D1. In addition, it should be noted that: the lattice-like grooves D4 and the tubular groove D5 actually should not appear on FIG. 6 which shows the clay inflow surface D1 of the die D; however, for illustrating the positional relationship of the lattice-like grooves D4 and the tubular groove D5 with the clay inflow holes D3, the lattice-like grooves D4 and the tubular groove D5 are also depicted on FIG. 6 with dashed lines.

The diameters of the clay inflow holes D3 may be suitably set. For example, the diameters of the clay inflow holes D3 may be set to be in the range of 0.5 to 2.0 mm. In the present embodiment, the clay inflow holes D3 are formed as circular holes.

In addition, the shape of the clay inflow holes D3 is not particularly limited. For example, the clay inflow holes D3 may alternatively be formed as elliptical (or oval) holes, polygonal holes or irregular-shaped holes. In these cases, the diameters of the clay inflow holes D3 denote the diameters of equivalent circular holes which have the same cross-sectional areas as the respective clay inflow holes D3.

In the low-flow-speed region DL of the die D, there are formed those clay inflow holes D3 which communicate with the first lattice-like grooves D41. On the other hand, in the high-flow-speed region DH of the die D, there are formed those clay inflow holes D3 which communicate with the second lattice-like grooves D42. Hereinafter, for the sake of convenience of explanation, the clay inflow holes D3 formed in the low-flow-speed region DL will be referred to as first clay inflow holes D31 whereas the clay inflow holes D3 formed in the high-flow-speed region DH will be referred to second clay inflow holes D32.

The diameter of the first clay inflow holes D31 and the diameter of the second clay inflow holes D32 may be set to be either equal to or different from each other.

It is preferable to set the diameter of the second clay inflow holes D32 formed in the high-flow-speed region DH to be larger than the diameter of the first clay inflow holes D31 formed in the low-flow-speed region DL. In this case, it is possible to minimize variation in the flow rate of the clay in the die D. Moreover, it is also possible to prevent the diameter of clay flow holes 14 (to be described later) of the flow speed control plate 1, which is used in contact with the clay inflow surface D1 of the die D, from becoming too small. This is because the diameter of the clay flow holes 14 of the flow speed control plate 1 is set to be smaller than the diameter of the second clay inflow holes D32 as will be described in detail later.

Next, the flow speed control plate 1 according to the present embodiment will be described with reference to FIGS. 7-11.

Figure 8:
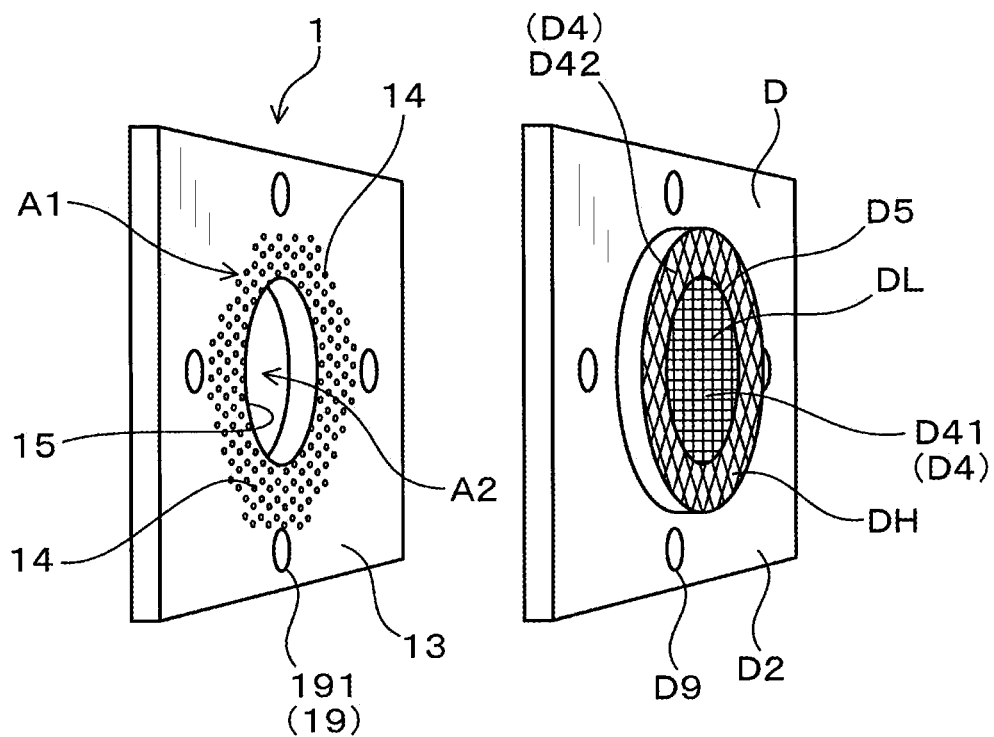
FIG. 8 is a perspective view of the die and the flow speed control plate before being assembled to each other.

As shown in FIGS. 8 and 9, the flow speed control plate 1 is used in a state of being superposed on the clay inflow surface D1 of the die D. In other words, the flow speed control plate 1 has a contact surface that is in contact with (or abuts) the clay inflow surface D1 of the die D.

The flow speed control plate 1 includes a base plate 11, a number of clay flow holes 14 and a positioning mechanism 19.

The base plate 11 has both a clay supply surface 12 and a clay outflow surface 13. The clay supply surface 12 is a surface on the side where the clay flows into the clay flow holes 14 formed in the base plate 11. The clay outflow surface 13 is a surface on the side where the clay flows out of the clay flow holes 14. The clay supply surface 12 and the clay outflow surface 13 are opposite to (or face away from) each other in a thickness direction of the base plate 11 (see FIGS. 8 and 9). In addition, the clay outflow surface 13 constitutes the aforementioned contact surface of the flow speed control plate 1.

The clay flow holes 14 are formed in the base plate 11 so as to penetrate the base plate 11 in the thickness direction thereof. Each of the clay flow holes 14 is formed at a position corresponding to the position of a corresponding one of the clay inflow holes D3 of the die D. That is, the clay flow holes 14 are formed in the base plate 11 so that when the flow speed control plate 1 is superposed on the die D, each of the clay flow holes 14 communicates with a corresponding one of the clay inflow holes D3 of the die D. More specifically, in the present embodiment, the clay flow holes 14 are formed in the base plate 11 so that when the flow speed control plate 1 is superposed on the die D, each of the clay flow holes 14 has its central axis arranged coaxially with the central axis of a corresponding one of the clay inflow holes D3 of the die D.

The clay flow holes 14 are not necessarily formed over the entire flow speed control plate 1. In other words, it is not necessary that each of the clay inflow holes D3 of the die D has a corresponding one of the clay flow holes 14 of the flow speed control plate 1 communicating therewith. Instead, the clay flow holes 14 may be formed only in a region of the flow speed control plate 1 which corresponds to a region of the die D where it is desired to control the flow speed of the clay.

In the present embodiment, as shown in FIGS. 7-9, 10A and 11, the clay flow holes 14 are formed only in a region of the flow speed control plate 1 which corresponds to the high-flow-speed region DH of the die D. That is, each of the clay flow holes 14 is formed at a position corresponding to the position of a corresponding one of the second clay inflow holes D32 formed in the high-flow-speed region DH of the die D. Hereinafter, for the sake of convenience of explanation, the region of the flow speed control plate 1 where the clay flow holes 14 are formed to control the flow speed of the clay will be referred to as flow speed control region A1.

As above, in the present embodiment, the flow speed control plate 1 includes the flow speed control region A1 which corresponds to the high-flow-speed region DH of the die D and in which the clay flow holes 14 are formed. That is, when the flow speed control plate 1 is superposed on the die D, the flow speed control region A1 of the flow speed control plate 1 overlaps the high-flow-speed region DH of the die D and each of the clay flow holes 14 formed in the flow speed control region A1 communicates with a corresponding one of the second clay inflow holes D32 formed in the high-flow-speed region DH.

Moreover, the flow speed control plate 1 also includes a flow speed non-control region A2 which corresponds to the low-flow-speed region DL of the die D and via which the clay is supplied to the die D without flowing through the clay flow holes 14. That is, when the flow speed control plate 1 is superposed on the die D, the flow speed non-control region A2 of the flow speed control plate 1 overlaps the low-flow-speed region DL of the die D.

More particularly, in the present embodiment, as shown in FIGS. 7-9 and 11, the flow speed non-control region A2 is constituted of a large-diameter hole 15 which penetrates the base plate 11 of the flow speed control plate 1 in the thickness direction thereof and has a diameter considerably larger than the diameter of the clay flow holes 14.

Figure 11:
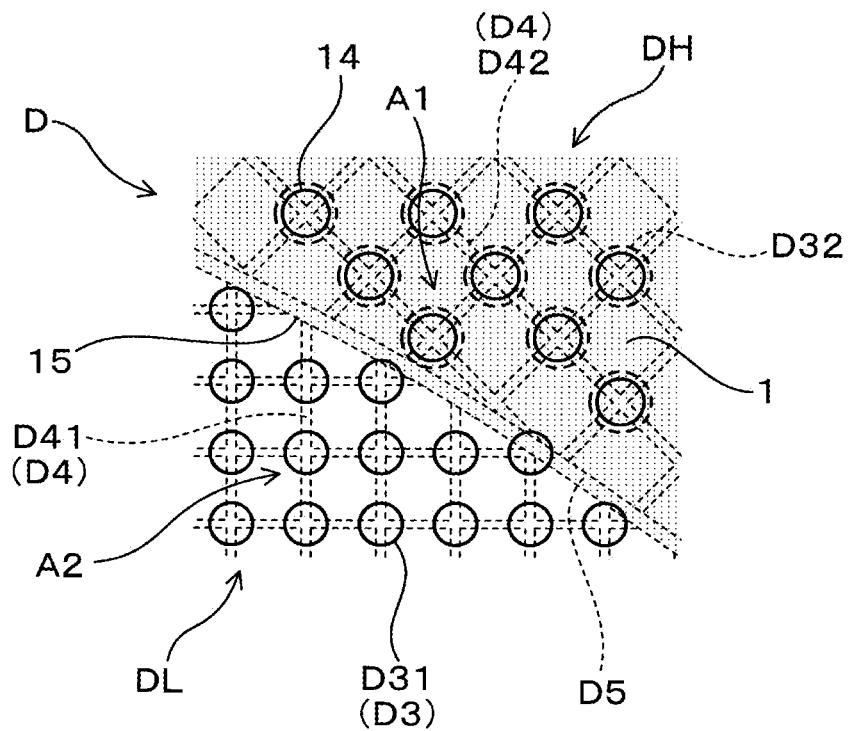
FIG. 11 is a schematic view of part of the assembly of the die and the flow speed control plate from a clay supply surface of the flow speed control plate.

In addition, FIG. 11 shows part of the assembly of the die D and the flow speed control plate 1 viewed from the clay supply surface 12 of the flow speed control plate 1. In FIG. 11, the flow speed control region A1 is hatched whereas the flow speed non-control region A2 is not hatched. It should be noted that: the second clay inflow holes D32, the lattice-like grooves D4 and the tubular groove D5 of the die D actually should not appear on FIG. 11; however, for illustrating the positional relationship of them with the clay flow holes 14 of the flow speed control plate 1, they are also depicted on FIG. 11 with dashed lines.

As shown in FIG. 11, the flow speed control region A1 includes the clay flow holes 14 and those portions of the base plate 11 which surround the clay flow holes 14. The flow speed control region A1 is formed around the large-diameter hole 15 that constitutes the flow speed non-control region A2.

The diameter of the large-diameter hole 15 is set to be sufficiently large so that the large-diameter hole 15 has almost no influence on the flow speed of the clay flowing therethrough. The diameter of the large-diameter hole 15 may be suitably set according to, for example, the dimensions of the low-flow-speed region DL and the tubular groove D5 of the die D. For example, the diameter of the large-diameter hole 15 may be set to be in the range of 40 to 300 mm.

In the present embodiment, the large-diameter hole 15 is formed as a circular hole. However, the shape of the large-diameter hole 15 is not particularly limited. For example, the large-diameter hole 15 may alternatively have those non-circular shapes which will be described later in a third embodiment with reference to FIGS. 16-18. In addition, the large-diameter hole 15 may be formed, for example, along the tubular groove D5 of the die D for forming the boundary wall M4 of the monolithic substrate M.

As shown in FIG. 11, the diameter of the large-diameter hole 15 may be set to be not larger than an inner diameter of the tubular groove D5, thereby having the tubular groove D5 completely covered by the flow speed control region A1 of the flow speed control plate 1. Moreover, the diameter of the large-diameter hole 15 may alternatively be set to be larger than an outer diameter of the tubular groove D5, thereby having the tubular groove D5 located within the flow speed non-control region A2 of the flow speed control plate 1. Furthermore, the large-diameter hole 15 may alternatively be formed to have part of the tubular groove D5 covered by the flow speed control region A1 and the remainder of the tubular groove D5 located within the flow speed non-control region A2.

In the flow speed non-control region A2, the clay supplied from the clay supply surface 12 of the flow speed control plate 1 flows through the large-diameter hole 15; then the clay flowing out of the large-diameter hole 15 from the clay outflow surface 13 of the flow speed control plate 1 is supplied to the die D. Consequently, in the flow speed non-control region A2, the clay receives almost no physical resistance when passing through the flow speed control plate 1; thus the clay is supplied to the die D with almost no reduction in its flow speed.

Figure 10A:
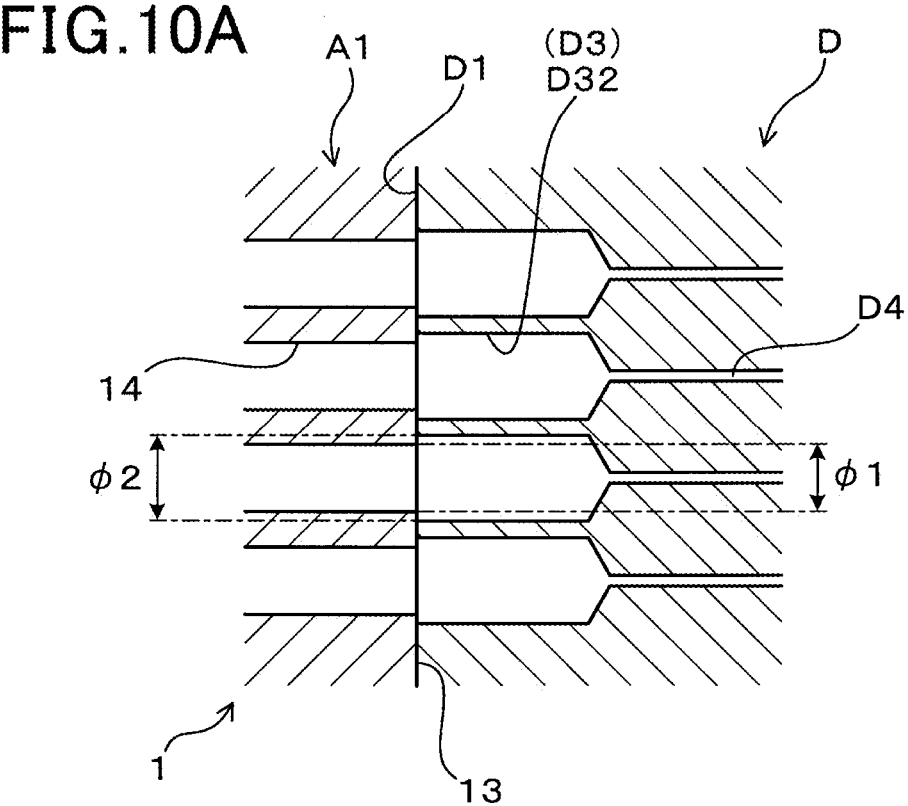
FIG. 10A is an enlarged cross-sectional view showing part of an assembly of the die and the flow speed control plate in a state where clay flow holes of the flow speed control plate are respectively aligned with corresponding clay inflow holes of the die.

In the present embodiment, as shown in FIGS. 10A and 11, the diameter of the clay flow holes 14, which are formed in the flow speed control region A1, on the clay outflow surface 13 of the flow speed control plate 1 is smaller than the diameter of the second clay inflow holes D32 on the clay inflow surface D1 of the die D.

That is, as shown in FIG. 10A, the diameter $\phi 1$ of the clay flow holes 14 at the openings thereof on the clay outflow surface 13 of the flow speed control plate 1 and the diameter $\phi 2$ of the second clay inflow holes D32 at the openings thereof on the clay inflow surface D1 of the die D satisfy the following relationship: $\phi 1 < \phi 2$.

Satisfying the above relationship, when at least one of the flow speed control plate 1 and the die D is deformed due to the clay flowing thereinto and thus positional misalignment occurs between the clay flow holes 14 of the flow speed control plate 1 and the corresponding second clay inflow holes D32 of the die D, it is still possible to prevent the clay flowing out of the clay flow holes 14 of the flow speed control plate 1 from interfering with the die D. Moreover, when the machining accuracy of the clay flow holes 14 and the second clay inflow holes D32 is low and thus positional misalignment occurs between the clay flow holes 14 and the corresponding second clay inflow holes D32, it is still possible to prevent the clay flowing out of the clay flow holes 14 of the flow speed control plate 1 from interfering with the die D.

As a result, it is possible to prevent the clay flow holes 14 and the second clay inflow holes D32 from becoming small at the boundaries therebetween due to the aforementioned interference, thereby preventing the flow speed of the clay from becoming uneven in the die D. Hence, it is possible to suppress occurrence of formation defects in the resultant monolithic substrate M.

Figure 10B:
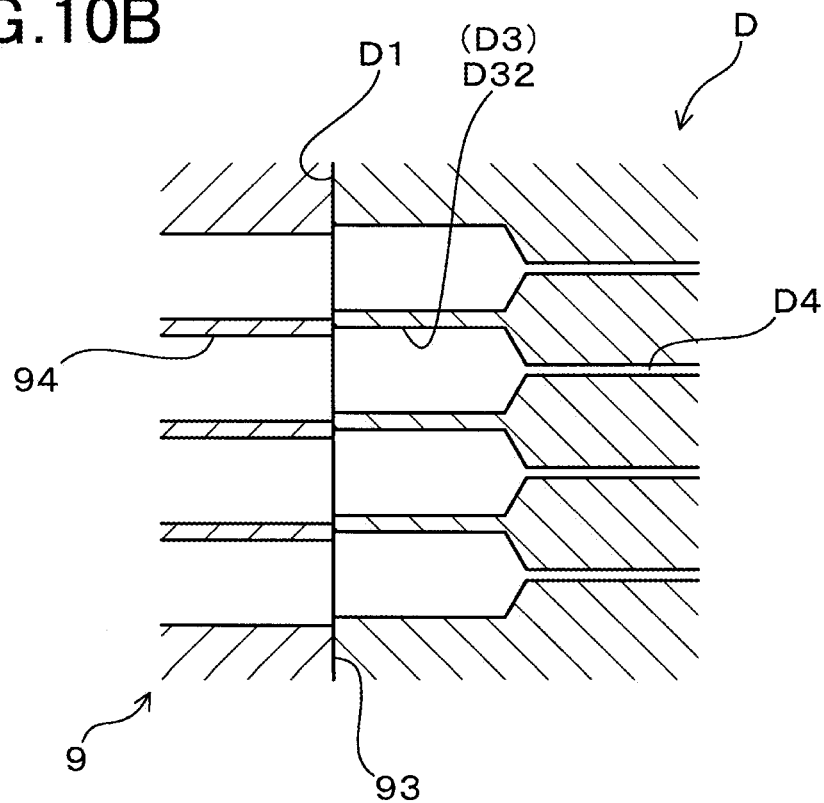
FIG. 10B is an enlarged cross-sectional view showing part of the assembly of the die and a flow speed control plate according to a comparative example in a state where the clay flow holes of the flow speed control plate are respectively misaligned with the corresponding clay inflow holes of the die.

In contrast, as shown in FIG. 10B, in the case of a flow speed control plate 9 according to a comparative example, the diameter of clay flow holes 94 of the flow speed control plate 9 is set to be not smaller than (more particularly, equal to) the diameter of the second clay inflow holes D32 of the die D. In this case, positional misalignment may occur between the clay flow holes 94 and the corresponding second clay inflow holes D32 when at least one of the flow speed control plate 9 and the die D is deformed due to the clay flowing thereinto and/or when the machining accuracy of the clay flow holes 94 and the second clay inflow holes D32 is low. In other words, the central axes of the clay flow holes 94 may become out of alignment with the central axes of the corresponding second clay inflow holes D32. Consequently, the clay flowing out of the clay flow holes 94 of the flow speed control plate 9 would interfere with the die D. As a result, the flow speed of the clay would become uneven in the die D, so that formation defects might occur in the resultant monolithic substrate M.

Moreover, setting the diameter of the clay flow holes 14 of the flow speed control plate 1 to be smaller than the diameter of the second clay inflow holes D32 of the die D (see FIG. 10A), it is possible to reduce the thickness of the flow speed control plate 1 for imposing the same resistance on the flow of the clay in comparison with the case of setting the diameter of the clay flow holes 14 to be greater than or equal to the diameter of the second clay inflow holes D32. Consequently, with the reduced thickness, it becomes easier for the flow speed control plate 1 to follow the die D when the clay is supplied. As a result, it becomes possible to prevent formation of a gap between the flow speed control plate 1 and the die D and thus leakage of the clay via such a gap.

Furthermore, though not shown in the figures, in the case of setting the diameter of the clay flow holes 14 of the flow speed control plate 1 to be larger than the diameter of the second clay inflow holes D32 of the die D, those portions of the die D which surround the second clay inflow holes D32 on the clay inflow surface D1 of the die D may be worn when the clay flows across the boundaries between the clay flow holes 14 of the flow speed control plate 1 and the corresponding second clay inflow holes D32 of the die D. That is, the die D, which is generally expensive, may be worn down. In contrast, setting the diameter of the clay flow holes 14 of the flow speed control plate 1 to be smaller than the diameter of the second clay inflow holes D32 of the die D (see FIG. 10A), it is possible to prevent the die D from being worn when the clay flows across the boundaries between the clay flow holes 14 of the flow speed control plate 1 and the corresponding second clay inflow holes D32 of the die D.

The diameter of the clay flow holes 14 of the flow speed control plate 1 may be suitably set according to, for example, the diameters of the clay inflow holes D3 (or the first and second clay inflow holes D31 and D32) of the die D, the machining accuracy of the center coordinates of the clay inflow holes D3 in the die D, the machining accuracy of the center coordinates of the clay flow holes 14 in the flow speed control plate 1, the diameter and center coordinates of circular holes of the positioning mechanism 19 and the accuracy of the diameter of pins inserted into the positioning mechanism 19. For example, the diameter of the clay flow holes 14 of the flow speed control plate 1 may be set to be in the range of 0.2 to 1.9 mm.

In addition, the diameter of the clay flow holes 14 may be either constant or varied in the thickness direction of the flow speed control plate 1. However, in terms of facilitating formation of the clay flow holes 14, it is preferable to set the diameter of the clay flow holes 14 to be constant in the thickness direction of the flow speed control plate 1.

Figure 7:
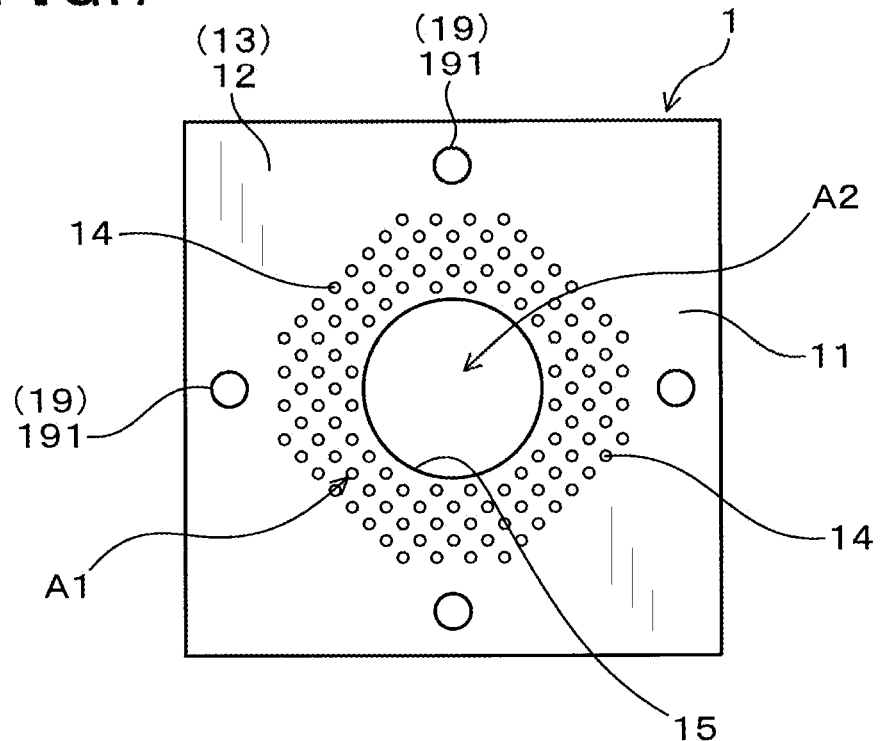
FIG. 7 is a front view of the flow speed control plate.

As shown in FIGS. 7-9, the flow speed control plate 1 includes the positioning mechanism 19 configured to position the flow speed control plate 1 with respect to the die D. Specifically, the positioning mechanism 19 positions the flow speed control plate 1 with respect to the die D so that each of the clay flow holes 14 of the flow speed control plate 1 has its central axis arranged coaxially with the central axis of a corresponding one of the second clay inflow holes D32 of the die D. More particularly, in the present embodiment, the positioning mechanism 19 is constituted of a plurality (e.g., four) of positioning holes 191. On the other hand, the die D also includes a positioning mechanism that is constituted of a plurality (e.g., four) of positioning holes D9.

Each of the positioning holes 191 of the flow speed control plate 1 is formed at a position corresponding to the position of a corresponding one of the positioning holes D9 of the die D. Consequently, when the flow speed control plate 1 is assembled to (or superposed on) the die D, each of the positioning holes 191 of the flow speed control plate 1 has its central axis arranged coaxially with the central axis of a corresponding one of the positioning holes D9 of the die D and each of the clay flow holes 14 of the flow speed control plate 1 has its central axis arranged coaxially with the central axis of a corresponding one of the second clay inflow holes D32 of the die D. In addition, as shown in FIG. 9, the flow speed control plate 1 is fixed to the die D by a plurality of fixing means (e.g., fixing pins or bolts) 192 each of which is inserted in one corresponding pair of the positioning holes 191 of the flow speed control plate 1 and the positioning holes D9 of the die D.

As described previously, in the case of the flow speed control plate 9 according to the comparative example, the diameter of the clay flow holes 94 of the flow speed control plate 9 is set to be not smaller than (more particularly, equal to) the diameter of the second clay inflow holes D32 of the die D (see FIG. 10B). Therefore, even if the flow speed control plate 9 includes the same positioning mechanism 19 as described above, it would still be difficult to prevent the clay flowing out of the clay flow holes 94 of the flow speed control plate 9 from interfering with the die D. In contrast, in the case of the flow speed control plate 1 according to the present embodiment, the diameter of the clay flow holes 14 of the flow speed control plate 1 is set to be smaller than the diameter of the second clay inflow holes D32 of the die D (see FIG. 10A). Consequently, with the positioning mechanism 19 positioning the flow speed control plate 1 with respect to the die D as described above, it is possible to more reliably prevent the clay flowing out of the clay flow holes 14 of the flow speed control plate 1 from interfering with the die D. As a result, it is possible to more reliably prevent the flow speed of the clay from becoming uneven in the die D, thereby more reliably suppressing occurrence of formation defects in the resultant monolithic substrate M.

Next, a method of manufacturing the monolithic substrate M using the die D and the flow speed control plate 1 according to the present embodiment will be described.

In the present embodiment, the method of manufacturing the monolithic substrate M includes a preparing step, an extrusion step and a firing step.

First, in the preparing step, the die D, the flow speed control plate 1 according to the present embodiment and the clay are prepared.

Specifically, as mentioned previously, the clay includes raw materials which will form a desired ceramic (e.g., cordierite in the present embodiment) after the firing step.

Moreover, as shown in FIGS. 8 and 9, the die D and the flow speed control plate 1 are superposed on each other, thereby bringing the clay inflow surface D1 of the die D and the clay outflow surface 13 of the flow speed control plate 1 into contact with each other.

Then, as shown in FIG. 9, each of the plurality of fixing means (e.g., fixing pins or bolts) 192 is inserted into one corresponding pair of the positioning holes 191 of the flow speed control plate 1 and the positioning holes D9 of the die D, thereby fixing the flow speed control plate 1 and the die D to each other. Consequently, the flow speed control plate 1 and the die D are assembled to each other. In addition, on the outer periphery of the high-flow-speed region DH on the extrusion surface D2 of the die D, there is arranged an additional jig (not shown) for forming the outer skin M1 of the monolithic substrate M.

In the extrusion step, the assembly of the die D and the flow speed control plate 1 is arranged on a front end of an extruder. Then, the clay is extruded by the extruder.

Specifically, in this step, the clay, which is supplied from the clay supply surface 12 of the flow speed control plate 1, flows through each of the clay flow holes 14 in the flow speed control region A1 and through the large-diameter hole 15 in the flow speed non-control region A2. Then, both the clay which has flowed through the clay flow holes 14 and the clay which has flowed through the large-diameter hole 15 arrive at the clay inflow surface D1 of the die D.

During the flow of the clay through the clay flow holes 14, the flow speed of the clay is lowered due to the flow resistance in the clay flow holes 14. In contrast, during the flow of the clay through the large-diameter hole 15, the flow speed of the clay is hardly lowered.

Consequently, the clay, which has flowed through the clay flow holes 14 of the flow speed control plate 1 and thus whose flow speed has been lowered, is supplied to the high-flow-speed region DH of the die D where the flow speed of the clay is relatively high. In contrast, the clay, which has flowed through the large-diameter hole 15 of the flow speed control plate 1 and thus whose flow speed has almost not been lowered, is supplied to the low-flow-speed region DL of the die D where the flow speed of the clay is relatively low.

As a result, the flow speed of the clay becomes even in the die D, allowing the clay to be evenly extruded from the extrusion surface D2 of the die D. More specifically, by being extruded from the lattice-like grooves D4 and the tubular groove D5 formed in the extrusion surface D2, the clay is transformed into a honeycomb-shaped extrudate. In addition, during the extrusion of the clay, the outer skin M1 is also formed by the aforementioned additional jig.

In the firing step, the extrudate is microwave-dried and then cut into a desired length. Thereafter, the extrudate is fired at a predetermined temperature, forming the monolithic substrate M as shown in FIGS. 1 and 2.

Experiment

In this experiment, a plurality of extrudates were formed by extruding the clay using a plurality of sample flow speed control plates having different diameters of the clay flow holes 14. Then, formation defects occurring in the extrudates were investigated. The formation defects include "extrudate warp", "local cell collapse" and "local cell imperfection" which will be described later.

When the diameter of the clay flow holes 14 is varied, the thickness of the flow speed control plate 1 required to equalize the flow speed of the clay over all of regions having different cell densities also varies. Therefore, in the present experiment, the thickness of each of the sample flow speed control plates was set such that it is possible to equalize an average flow-speed difference on a plane perpendicular to the extrusion direction over all of the regions having different cell densities. Here, the term "average flow-speed difference on a plane perpendicular to the extrusion direction" is synonymous with the term "average forming-speed difference" which will be described later.

Specifically, in the present experiment, first, the plurality of sample flow speed control plates were prepared which have different diameters of the clay flow holes 14 at the openings thereof on the clay outflow surface 13. These sample flow speed control plates differ from each other only in thickness and the diameter of the clay flow holes 14.

Each of the sample flow speed control plates was then used to extrude the clay into one extrudate. Hereinafter, the extrudates obtained using the respective sample flow speed control plates will be referred to as "works".

For each of the works, a maximum flow-speed difference on a plane perpendicular to the extrusion direction was measured with respect to the clay extruded from the high-flow-speed region DH and the low-flow-speed region DL of the die D. Hereinafter, the maximum flow-speed difference will be referred to as "in-plane maximum forming-speed difference".

In the present experiment, each of the works was microwave-dried immediately after being extruded from the die D. More specifically, each of the works was in a state of being torn once by hands immediately after causing the clay (raw materials) to flow under pressure for about 60 seconds and then be extruded from the die D. This is because initial differences in level, which were formed due to the differences in flow speed, could not be observed if wire cutting or the like was performed. For each of the works, the initial differences in level (i.e., the differences in level immediately after the extrusion of the clay from the die D) were measured by image processing.

The average forming-speed difference was calculated by comparing the in-plane average flow speed in the high-cell-density region and the in-plane average flow speed in the low-cell-density region. In the present experiment, the plate thickness at which the average forming-speed difference is equal to 0 was determined for each clay flow hole. Moreover, when cell imperfection occurred in the vicinity of the boundary wall, more specifically inside the boundary wall, it was determined that the flow speed of the clay locally became zero; and the maximum forming-speed difference was determined to be 100%.

The maximum forming-speed difference was calculated by comparing the in-plane maximum flow speed and the in-plane minimum flow speed. In addition, in the calculation, the initial differences in level obtained by image processing were used. The conversion of the initial differences in level to the flow speeds was performed using the extrusion time required for forming the work.

Figure 12:
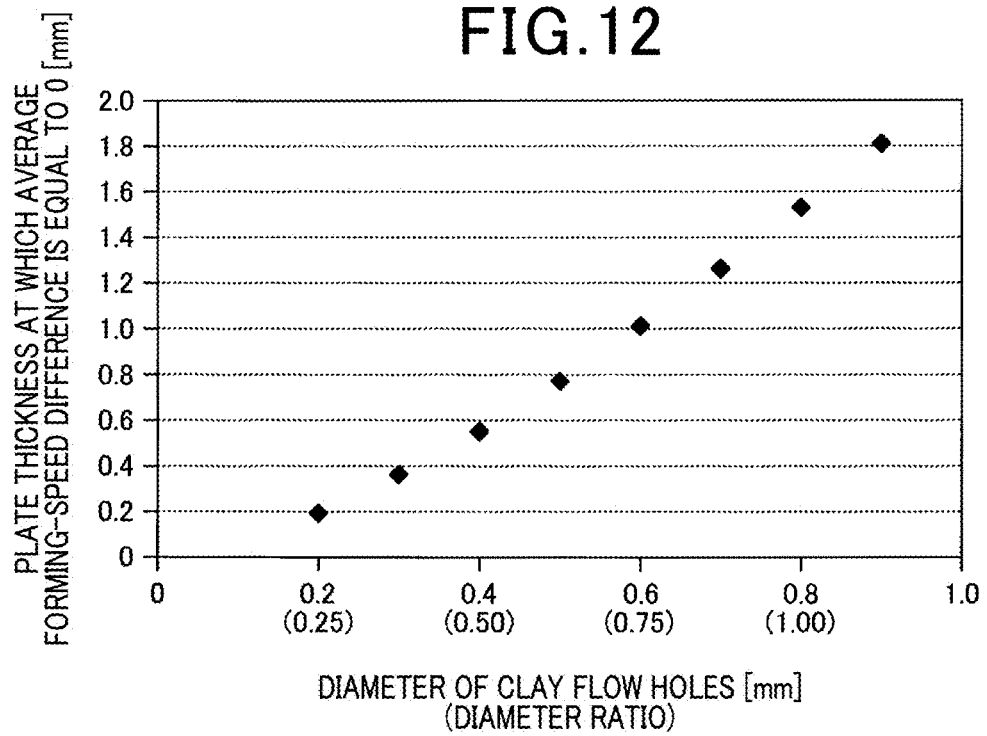
FIG. 12 is a graphical representation illustrating the relationship between the diameter of the clay flow holes and the thickness of the flow speed control plate at which an average forming-speed difference is equal to 0.
Figure 13:
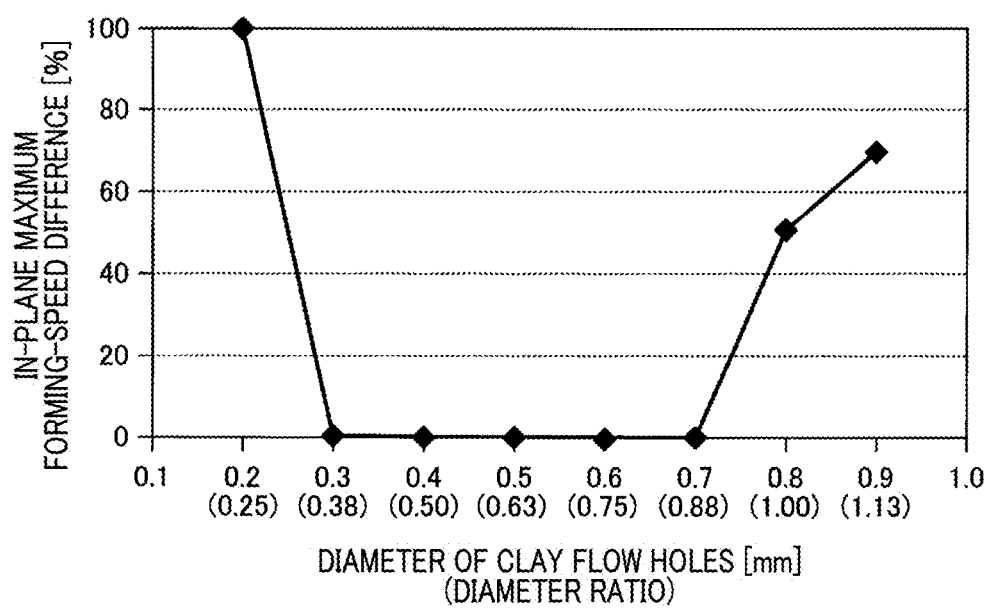
FIG. 13 is a graphical representation illustrating the relationship between the diameter of the clay flow holes and a maximum forming-speed difference on a plane perpendicular to an extrusion direction.

The results of the present experiment are shown in FIGS. 12 and 13.

In FIG. 12, the vertical axis represents the plate thickness (or the thickness of the flow speed control plate 1) at which the average forming-speed difference is equal to 0; the horizontal axis represents the diameter of the clay flow holes 14 on the clay outflow surface 13 of the flow speed control plate 1. In FIG. 13, the vertical axis represents the in-plane maximum forming-speed difference (or the maximum flow-speed difference on a plane perpendicular to the extrusion direction); the horizontal axis represents the diameter of the clay flow holes 14 on the clay outflow surface 13 of the flow speed control plate 1. In addition, in each of FIGS. 12 and 13, the decimal fractions in parentheses under the horizontal axis are the values of a diameter ratio OR. The diameter ratio $\phi R$ is the ratio of the diameter $\phi 1$ of the clay flow holes 14 of the flow speed control plate 1 to the diameter $\phi 2$ of the second clay inflow holes D32 of the die D (see FIG. 10A). That is, $\phi R = \phi 1/\phi 2$.

As can be seen from FIG. 13, when the diameter ratio OR was greater than or equal to 0.38 and less than or equal to 0.88, the in-plane maximum forming-speed difference was equal to 0. That is, it was possible to equalize the flow speed of the clay and thereby prevent occurrence of formation defects. Therefore, as shown in FIG. 14A, it was possible to prevent occurrence of formation defects even in the vicinity of the boundary wall M4 between the high-cell-density region MH and the low-cell-density region ML, where it is generally easy for formation defects to occur.

In contrast, when the diameter ratio $\phi R$ was less than 0.38, the in-plane maximum forming-speed difference was not equal to 0. That is, the amount of the clay flowing into the die D was insufficient and thus "fine splits" might occur. Here, the term "fine splits" denotes a formation detect where the cell walls M2, which should be formed continuously in the extrusion direction, become discontinuous in the extrusion direction. Consequently, as shown in FIG. 14B, "local cell imperfection" might occur. Here, the term "local cell imperfection" denotes a formation defect where parts of the cell walls M2 are missing (or absent). In addition, in FIG. 14B, the missing parts of the cell walls M2 are designated by M2L.

On the other hand, when the diameter ratio $\phi R$ was greater than 0.88, the in-plane maximum forming-speed difference was also not equal to 0. That is, the amount of the clay flowing into the die D was insufficient at those areas where the clay flowing out of the clay flow holes 14 of the flow speed control plate 1 interfered with the die D. Consequently, the above-described formation defect of fine splits might occur. Moreover, there might be a difference in the flow speed of the clay extruded from the extrusion surface D2 of the die D between those areas where the clay flowing out of the clay flow holes 14 interfered with the die D and the other areas where there was no interference of the clay flowing out of the clay flow holes 14 with the die D. Furthermore, when the difference in the flow speed of the clay was large, part of the clay would be extruded obliquely with respect to the extrusion direction.

As a result, as shown in FIG. 14C, "extrudate warp" might occur. Here, the term "extrudate warp" denotes a formation detect where the extrudate is warped (i.e., bent or twisted) and thus the axial direction X of the extrudate (or the monolithic substrate M) becomes oblique to the horizontal direction in at least part of the extrudate.

Furthermore, when the diameter ratio OR was considerably greater than 0.88, "local cell collapse" might occur. Here, the term "local cell collapse" denotes a formation detect where some of the cell walls M2 are distorted and thus some of the cells M3 are collapsed as shown in FIG. 14D. In addition, the distortion of the cell walls M2 is caused by the fact that the amount of the clay flowing from the flow speed control plate 1 into the die D is excessive and thus the flow speed of the clay in the high-flow-speed region DH becomes higher that in the low-flow-speed region DL.

Accordingly, it is clear from the above results of the present experiment that in terms of more reliably preventing occurrence of formation defects, it is preferable to set the diameter ratio $\phi R$ to be in the range of 0.38 to 0.88. In addition, as described previously, the diameter ratio $\phi R$ is the ratio of the diameter $\phi 1$ of the clay flow holes 14 of the flow speed control plate 1 to the diameter ϕ2 of the second clay inflow holes D32 of the die D.

Second Embodiment

Figure 15:
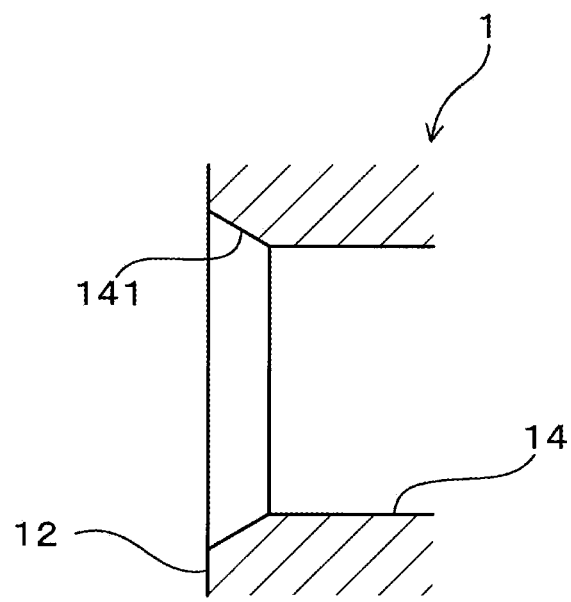
FIG. 15 is an enlarged cross-sectional view of part of a flow speed control plate according to a second embodiment.

FIG. 15 shows part of a flow speed control plate 1 according to a second embodiment.

As shown in FIG. 15, in the present embodiment, each of the clay flow holes 14 of the flow speed control plate 1 has a shoulder 141 formed at its opening on the clay supply surface 12 of the flow speed control plate 1 so as to taper in from the clay supply surface 12 in the thickness direction of the base plate 11 of the flow speed control plate 1.

Specifically, for each of the clay flow holes 14, the shoulder 141 of the clay flow hole 14 is formed to taper in from the clay supply surface 12 in the thickness direction of the base plate 11. Consequently, at the shoulder 141, the diameter of the clay flow hole 14 gradually increases in the thickness direction of the base plate 11 toward the clay supply surface 12. On the other hand, in the range from the shoulder 141 to the clay outflow surface 13 of the flow speed control plate 1, the diameter of the clay flow hole 14 is kept constant at a given diameter in the thickness direction of the base plate 11.

With the shoulders 141 formed respectively at the openings of the clay flow holes 14 on the clay supply surface 12, it is possible to suppress fluctuations in the flow speed of the clay due to wear of the flow speed control plate 1. That is, with the shoulders 141, it is possible to suppress variation in the flow rate of the clay in the die D over a long period of time. The reason is as follows.

In the flow speed control plate 1, the pressure loss at the inlets of the clay flow holes 14 (i.e., the openings of the clay flow holes 14 on the clay supply surface 12) is high; thus it is easy for the clay supply surface 12 to be worn by the flow of the clay that includes the ceramic raw materials. However, with the shoulders 141 formed respectively at the openings of the clay flow holes 14 on the clay supply surface 12, those parts of the flow speed control plate 1 which otherwise could be easily worn down by the flow of the clay have been intentionally removed in advance. Consequently, it is possible to prevent unexpected fluctuations in the flow speed of the clay due to wear of the flow speed control plate 1.

That is, with the shoulders 141 formed respectively at the openings of the clay flow holes 14 on the clay supply surface 12, the amount of wear of the flow speed control plate 1 can be reduced, thereby preventing fluctuations in the flow speed of the clay due to long-term wear of the flow speed control plate 1.

In addition, for each of the clay flow holes 14, the shoulder 141 of the clay flow hole 14 may also be referred to as a diameter-increased portion of the clay flow hole 14 where the diameter of the clay flow hole 14 is gradually increased in the thickness direction of the base plate 11 toward the clay supply surface 12. Otherwise, the shoulder 141 may also be referred to as a diameter-reduced portion of the clay flow hole 14 where the diameter of the clay flow hole 14 is gradually reduced in the thickness direction of the base plate 11 from the clay supply surface 12 toward the inside of the clay flow hole 14.

The width of the shoulders 141 of the clay flow holes 14 in the thickness direction of the base plate 11 is not particularly limited. For example, the width of the shoulders 141 of the clay flow holes 14 may be set to be, for example, not larger than 20% of the overall width of the clay flow holes 14 in the thickness direction of the base plate 11. Moreover, in terms of allowing the flow speed control plate 1 to impose a sufficient resistance on the flow of the clay and reducing the time required for forming the shoulders 141 of the clay flow holes 14 by a chamfering process, it is preferable to set the width of the shoulders 141 to be not larger than 5% of the overall width of the clay flow holes 14. On the other hand, in terms of reliably achieving the above-described advantageous effects with the shoulders 141 of the clay flow holes 14, it is preferable to set the width of the shoulders 141 to be not smaller than 1% of the overall width of the clay flow holes 14, and more preferable to set the width of the shoulders 141 to be not smaller than 10% of the overall width of the clay flow holes 14. Accordingly, in view of the above, it is preferable to set the width of the shoulders 141 to be not larger than 5% and not smaller than 1% of the overall width of the clay flow holes 14.

The above-described flow speed control plate 1 according to the present embodiment has the same advantages as the flow speed control plate 1 according to the first embodiment.

Moreover, in the flow speed control plate 1 according to the present embodiment, with the shoulders 141 of the clay flow holes 14, it is possible to suppress fluctuations in the flow speed of the clay due to wear of the flow speed control plate 1. Consequently, it is possible to equalize the flow speed of the clay in the die D over a long period of time; thus it is possible to suppress, over a long period of time, occurrence of formation defects.

Third Embodiment

This embodiment illustrates a flow speed control plate 1 where the boundary 151 between the flow speed control region A1 and the flow speed non-control region A2 is formed so that when the flow speed control plate 1 is superposed on the die D, the first clay inflow holes D31 of the die D (i.e., the clay inflow holes D3 formed in the low-flow-speed region DL of the die D) are completely exposed to the flow speed non-control region A2 without being divided by the boundary 151.

Figure 16:
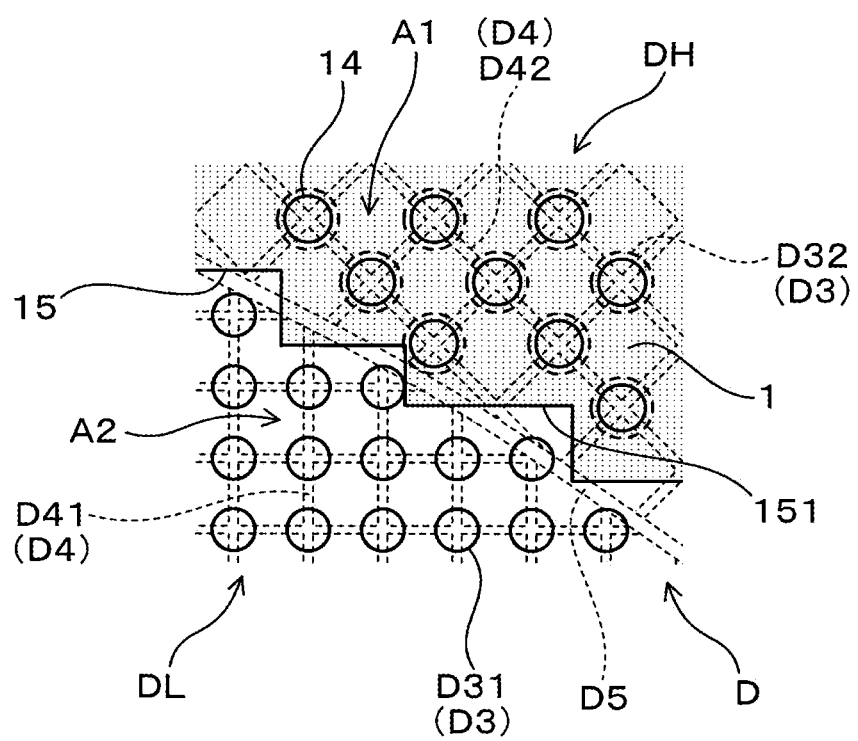
FIG. 16 is a schematic view of part of an assembly of a die and a flow speed control plate according to a third embodiment from a clay supply surface of the flow speed control plate.

FIG. 16 shows the configuration of the flow speed control plate 1 according to the present embodiment. As shown in the FIG. 16, when the clay outflow surface 13 of the flow speed control plate 1 is superposed on the clay inflow surface D1 of the die D, the first clay inflow holes D31 of the die D are completely exposed to the flow speed non-control region A2 without being divided by the boundary 151 between the flow speed control region A1 and the flow speed non-control region A2.

The shape of the boundary 151 may be adjusted by adjusting the shape of the large-diameter hole 15 of the flow speed control plate 1. For example, the large-diameter hole 15 may be formed to have the boundary 151 extending between the first clay inflow holes D31 and the second clay inflow holes D32 (i.e., the clay inflow holes D3 formed in the high-flow-speed region DH of the die D).

With the above configuration, it is possible to prevent the first clay inflow holes D31 of the die D from being blocked by the flow speed control plate 1 at the boundary 151. That is, when the flow speed control plate 1 is superposed on the die D, the first clay inflow holes D31 of the die D are completely exposed to the flow speed non-control region A2 that is constituted of the large-diameter hole 15 of the flow speed control plate 1.

Consequently, it is possible to prevent the edge of the large-diameter hole 15 from overlapping the first clay inflow holes D31 of the die D at the boundary 151, thereby preventing the clay flowing into the first clay inflow holes D31 from interfering with the edge of the large-diameter hole 15. As a result, it is possible to prevent the flow rate of the clay flowing into the first clay inflow holes D31 from being lowered due to interference of the clay with the edge of the large-diameter hole 15, thereby more reliably preventing the flow speed of the clay from becoming uneven in the die D.

Moreover, in the present embodiment, as shown in FIG. 16, the boundary 151 between the flow speed control region A1 and the flow speed non-control region A2 is stepped to include a plurality of sections (or sides) perpendicular to one another.

In addition, it should be noted that: the sections of the boundary 151 are not necessarily perpendicular to one another; instead, they may intersect one another at angles not equal to 90°.

Furthermore, the relative position of the boundary 151 between the flow speed control region A1 and the flow speed non-control region A2 to the tubular groove D5 of the die D may be suitably changed.

For example, in the present embodiment, as shown in FIG. 16, the boundary 151 is formed so that when the flow speed control plate 1 is superposed on the die D, the boundary 151 overlaps the tubular groove D5 of the die D in the thickness direction of the base plate 11 of the flow speed control plate 1. In other words, the boundary 151 is formed along the tubular groove D5. In addition, with the boundary 151 stepped in the present embodiment, the tubular groove D5 has both sections thereof overlapping the flow speed control region A1 in the thickness direction of the base plate 11 of the flow speed control plate 1 and sections thereof overlapping the flow speed non-control region A2 in the thickness.

Moreover, in the present embodiment, as shown in FIG. 16, when the flow speed control plate 1 is superposed on the die D, all of the first clay inflow holes D31 formed in the low-flow-speed region DL of the die D overlap the flow speed non-control region A2 of the flow speed control plate 1 while all of the second clay inflow holes D32 formed in the high-flow-speed region DH of the die D overlap the flow speed control region A1 of the flow speed control plate 1.

Figure 17:
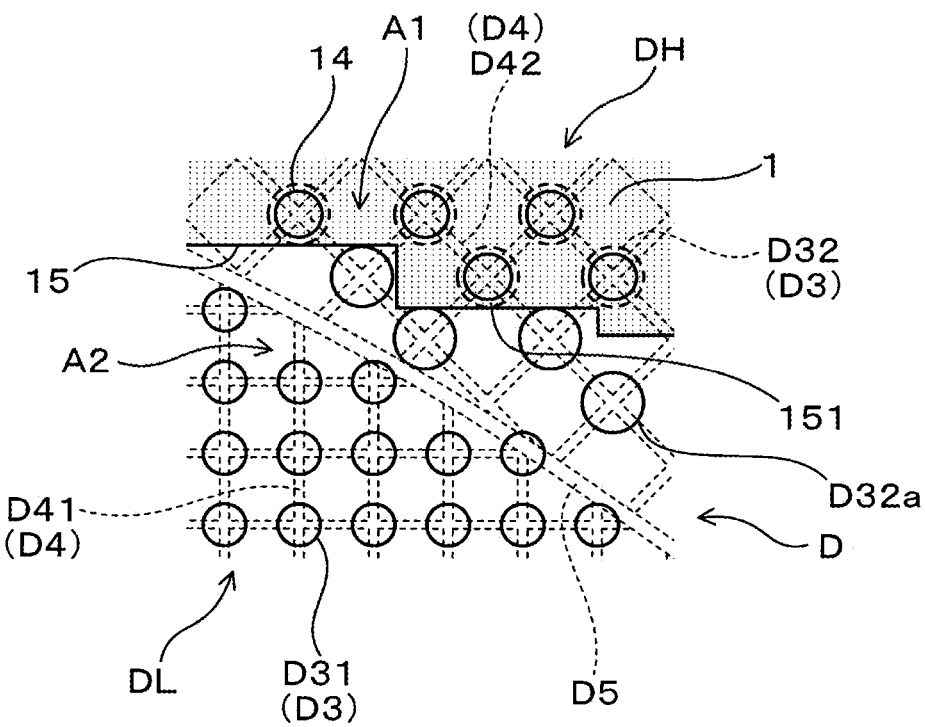
FIG. 17 is a schematic view of part of an assembly of the die and a flow speed control plate according to a first modification of the third embodiment from a clay supply surface of the flow speed control plate.

FIG. 17 shows the configuration of a flow speed control plate 1 according to a first modification. As shown in FIG. 17, in this modification, the boundary 151 is formed so that when the flow speed control plate 1 is superposed on the die D, the boundary 151 is located on the high-flow-speed region DH side of the tubular groove D5 of the die D. More specifically, of the second clay inflow holes D32 formed in the high-flow-speed region DH of the die D, those second clay inflow holes D32a which are adjacent to the tubular groove D5 are also exposed to the flow speed non-control region A2 of the flow speed control plate 1. On the other hand, all the second clay inflow holes D32 other than the second clay inflow holes D32a overlap the flow speed control region A1 of the flow speed control plate 1 in the thickness direction of the base plate 11 of the flow speed control plate 1. The tubular groove D5 of the die D overlaps the flow speed non-control region A2 in the thickness direction of the base plate 11 of the flow speed control plate 1. In addition, in this modification, the boundary 151 is also stepped to include a plurality of sections perpendicular one another.

With the above configuration of the flow speed control plate 1 according to the first modification, it is possible to reliably prevent the clay inflow holes D3 of the die D from being blocked by the flow speed control plate 1 at the boundary 151. Consequently, it is possible to prevent the clay flowing into the clay inflow holes D3 of the die D from interfering with the edge of the large-diameter hole 15. As a result, it is possible to prevent the flow rate of the clay flowing into the clay inflow hole D3 of the die D from being lowered due to interference of the clay with the edge of the large-diameter hole 15, thereby more reliably preventing the flow speed of the clay from becoming uneven in the die D.

Figure 18:
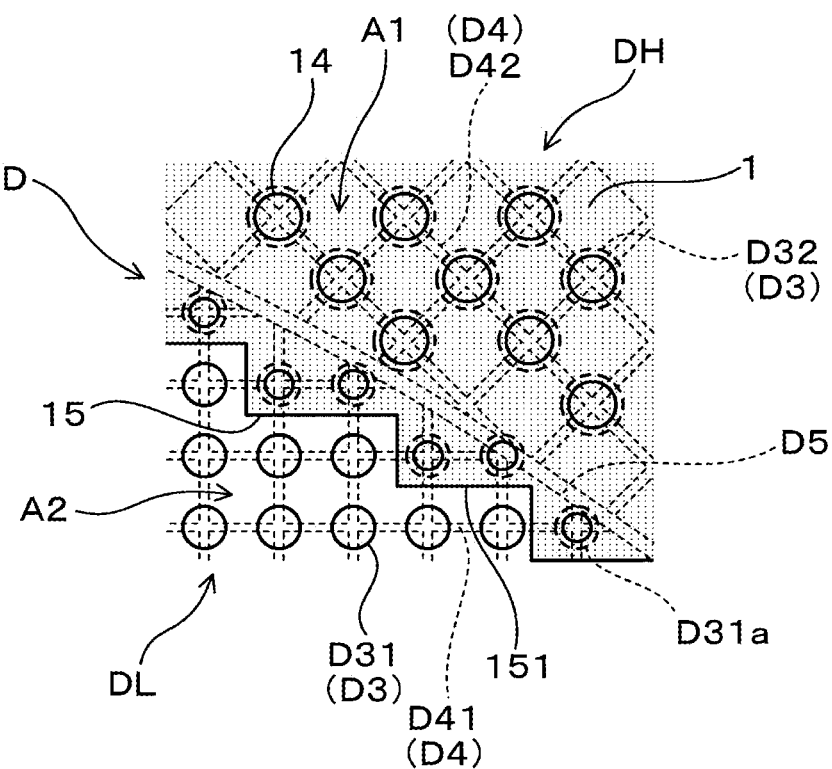
FIG. 18 is a schematic view of part of an assembly of the die and a flow speed control plate according to a second modification of the third embodiment from a clay supply surface of the flow speed control plate.

FIG. 18 shows the configuration of a flow speed control plate 1 according to a second modification. As shown in FIG. 18, in this modification, the boundary 151 is formed so that when the flow speed control plate 1 is superposed on the die D, the boundary 151 is located on the low-flow-speed region DL side of the tubular groove D5 of the die D. More specifically, of the first clay inflow holes D31 formed in the low-flow-speed region DL of the die D, those first clay inflow holes D31a which are adjacent to the tubular groove D5 are not exposed to the flow speed non-control region A2, but overlap the flow speed control region A1 of the flow speed control plate 1 in the thickness direction of the base plate 11 of the flow speed control plate 1. On the other hand, all the first clay inflow holes D31 other than the first clay inflow holes D31a are exposed to the flow speed non-control region A2 of the flow speed control plate 1. The tubular groove D5 of the die D overlaps the flow speed control region A1 of the flow speed control plate 1 in the thickness direction of the base plate 11 of the flow speed control plate 1. In addition, in this modification, the boundary 151 is also stepped to include a plurality of sections perpendicular one another.

With the above configuration of the flow speed control plate 1 according to the second modification, it is possible to reliably prevent the clay inflow holes D3 of the die D from being blocked by the flow speed control plate 1 at the boundary 151. Consequently, it is possible to prevent the clay flowing into the clay inflow holes D3 of the die D from interfering with the edge of the large-diameter hole 15. As a result, it is possible to prevent the flow rate of the clay flowing into the clay inflow hole D3 of the die D from being lowered due to interference of the clay with the edge of the large-diameter hole 15, thereby more reliably preventing the flow speed of the clay from becoming uneven in the die D.

Moreover, in the flow speed control plate 1 according to the second modification, as shown in FIG. 18, of the first clay inflow holes D31 formed in the low-flow-speed region DL of the die D, those first clay inflow holes D31a which are adjacent to the tubular groove D5 are not exposed to the flow speed non-control region A2, but overlap the flow speed control region A1 of the flow speed control plate 1.

Hence, it appears that the amount of the clay flowing into the first clay inflow holes D31a is suppressed by the flow speed control region A1 of the flow speed control plate 1 and thus the flow speed of the clay in the first clay inflow holes D31a is excessively low. However, the flow speed of the clay in the tubular groove D5 of the die D is high; therefore, the flow speed of the clay in the first clay inflow holes D31a, which are adjacent to the tubular groove D5, actually tends to become high under the influence of the high flow speed of the clay in the tubular groove D5. Accordingly, with the above configuration of the flow speed control plate 1 according to the second modification, the flow speed of the clay in the first clay inflow holes D31a can be made substantially equal to that in the other clay inflow hole D3 of the die D. Consequently, it is possible to more reliably prevent the flow speed of the clay from becoming uneven in the die D.

According to the present embodiment, it is possible to achieve the same advantageous effects as described in the first embodiment.

Moreover, in the present embodiment, it is possible to more effectively equalize the flow speed of the clay in the die D by adjusting the shape and position of the boundary 151 between the flow speed control region A1 and the flow speed non-control region A2. That is, the boundary 151 is preferably stepped so that when the flow speed control plate 1 is superposed on the die D, none of the clay inflow holes D3 of the die D are divided by the boundary 151 and those of the clay inflow holes D3 which are located on the low-flow-speed region DL of the boundary 151 are completely exposed to the flow speed non-control region A2 of the flow speed control plate 1. Furthermore, it is preferable for the boundary 151 to be formed so that when the flow speed control plate 1 is superposed on the die D, the boundary 151 is located on the low-flow-speed region DL side of the tubular groove D5 of the die D. It is more preferable for the boundary 151 to be formed so that when the flow speed control plate 1 is superposed on the die D, those first clay inflow holes D31a which are adjacent to the tubular groove D5 are not exposed to the flow speed non-control region A2, but overlap the flow speed control region A1 of the flow speed control plate 1.

Fourth Embodiment

Figure 19:
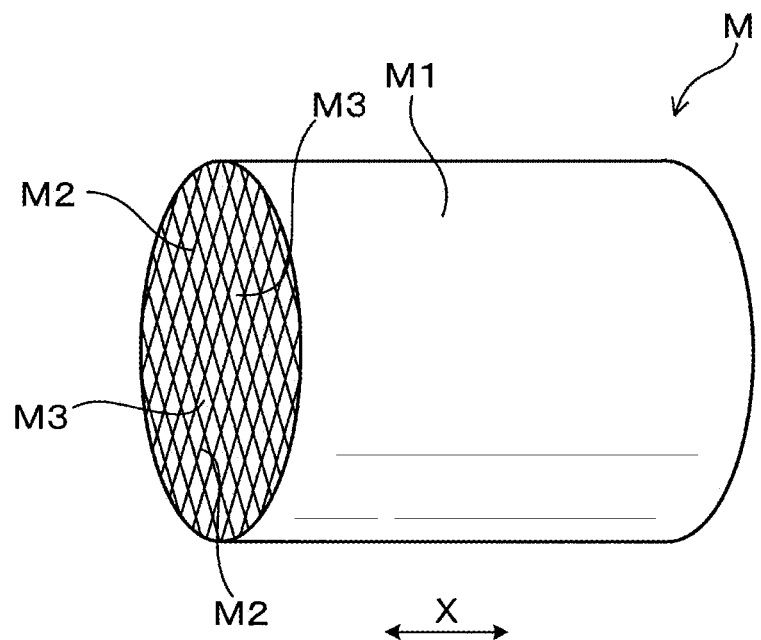
FIG. 19 is a perspective view of a monolithic substrate which is formed by extrusion using a die and a flow speed control plate according to a fourth embodiment.

FIG. 19 shows the overall configuration of a monolithic substrate M which is formed by extrusion using a die D and a flow speed control plate 1 according to a fourth embodiment.

The monolithic substrate M according to the present embodiment has almost the same configuration as the monolithic substrate M according to the first embodiment.

Specifically, the monolithic substrate M according to the present embodiment differs from the monolithic substrate M according to the first embodiment only in that: the cell density is set to be constant over the entire region within the outer skin M1 in the monolithic substrate M according to the present embodiment whereas it is set to be different between the high-cell-density region MH and the low-cell-density region ML in the monolithic substrate M according to the first embodiment; and no boundary wall M4 is formed in the monolithic substrate M according to the present embodiment whereas the boundary wall M4 is formed between the high-cell-density region MH and the low-cell-density region ML in the monolithic substrate M according to the first embodiment.

In the present embodiment, the monolithic substrate M is formed by:

extruding the clay as described in the first embodiment into an extrudate using the die D and the flow speed control plate 1 shown in FIGS. 20-23; and then firing the obtained extrudate.

Figure 20:
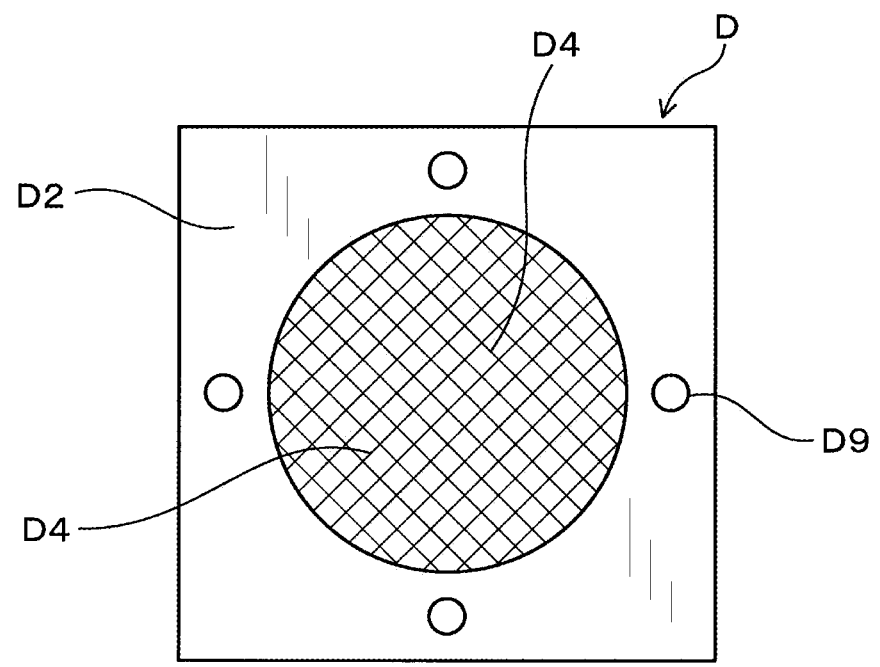
FIG. 20 is a front view of the die according to the fourth embodiment showing an extrusion surface of the die.
Figure 21:
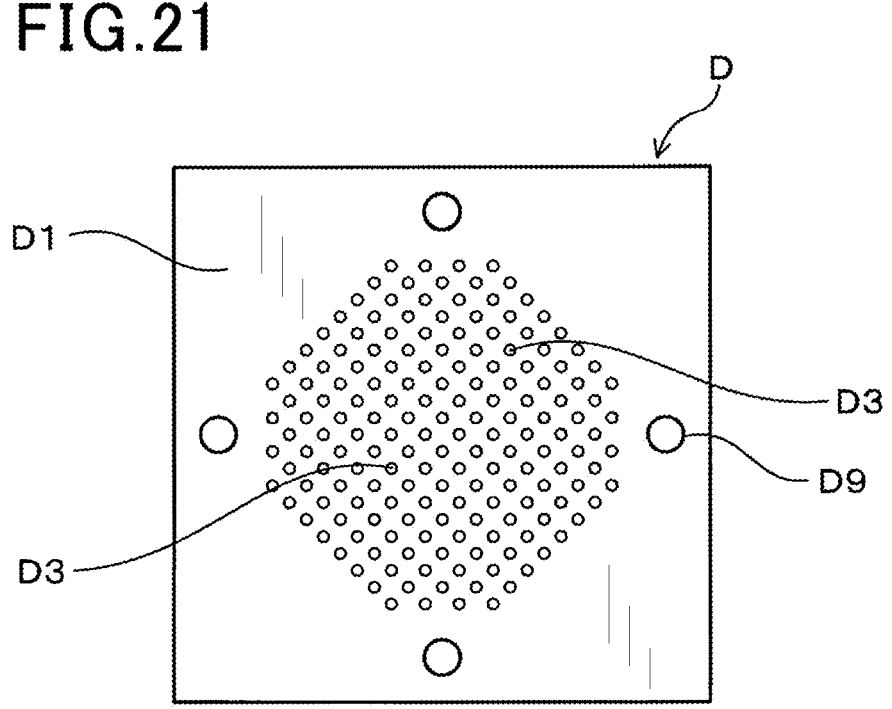
FIG. 21 is a rear view of the die according to the fourth embodiment showing a clay inflow surface of the die.

Specifically, in the present embodiment, the die D has both an extrusion surface D2 as shown in FIG. 20 and a clay inflow surface D1 as shown in FIG. 21.

In the extrusion surface D2 of the die D, there are formed lattice-like grooves D4. The lattice interval is set to be constant over all the lattice-like grooves D4. That is, none of the low-flow-speed region DL, the high-flow-speed region DH and the tubular groove D5 as described in the first embodiment are formed in the D according to the present embodiment.

In the clay inflow surface D1 of the die D, there are formed a number of clay inflow holes D3 to communicate with the lattice-like grooves D4 in the die D. All the clay inflow holes D3 have the same diameter. That is, unlike in the first embodiment, the clay inflow holes D3 are not classified into first clay inflow holes D31 and second clay inflow holes D32 in the die D according to the present embodiment.

Figure 22:
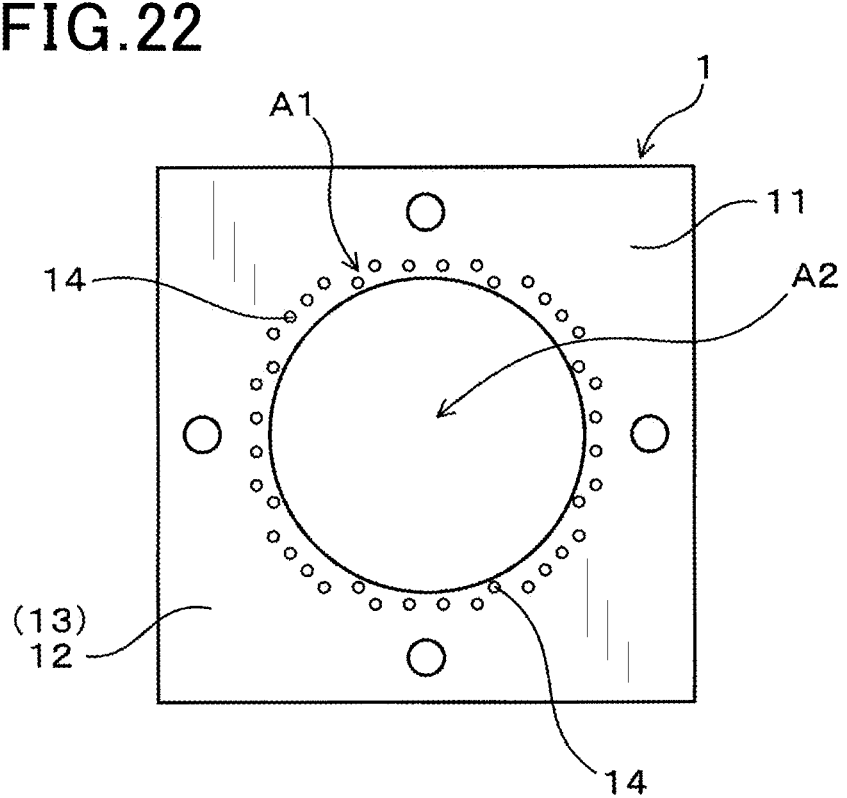
FIG. 22 is a front view of the flow speed control plate according to the fourth embodiment.
Figure 23:
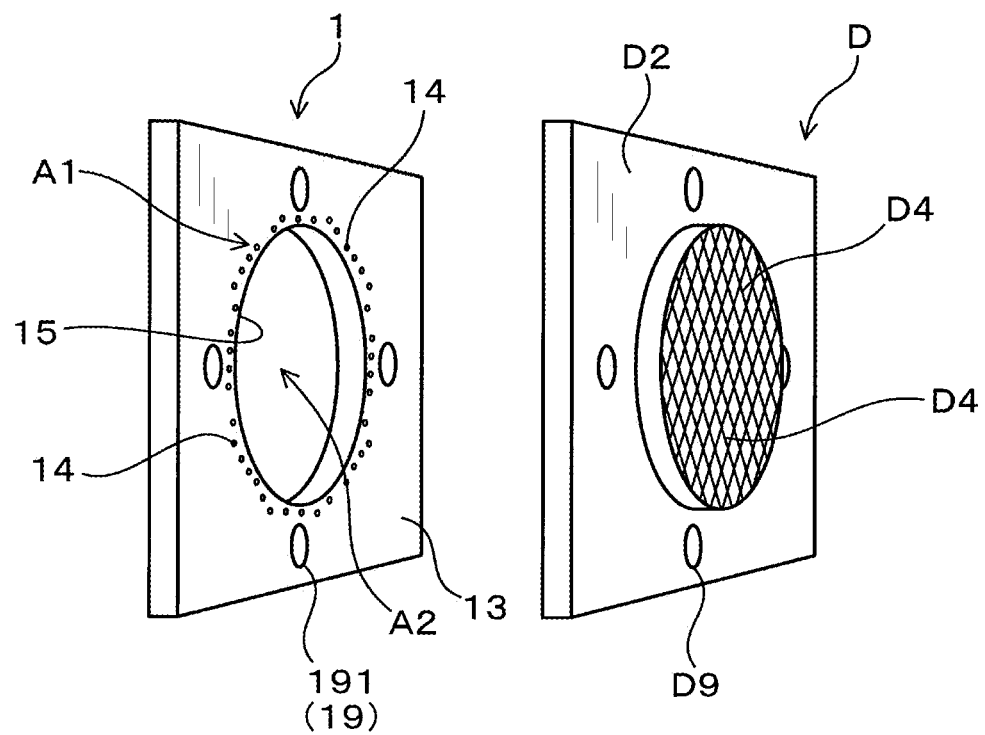
FIG. 23 is a perspective view of the die and the flow speed control plate according to the fourth embodiment before being assembled to each other.

In the present embodiment, as shown in FIGS. 22 and 23, the flow speed control plate 1 includes both a flow speed control region A1 and a flow speed non-control region A2. The flow speed control region A1 has a plurality of clay flow holes 14 formed therein. The clay flow holes 14 communicate with those clay inflow holes D3 of the die D which are provided to supply the clay to grooves for forming the outer skin M1 of the monolithic substrate M which is formed using an additional jig (not shown). On the other hand, the flow speed non-control region A2 is constituted of a large-diameter hole 15 that penetrates the base plate 11 of the flow speed control plate 1 in the thickness direction thereof. In the present embodiment, the diameter of the large-diameter hole 15 is set to be larger than in the first embodiment.

Moreover, in the present embodiment, the diameter of the clay flow holes 14 on the clay outflow surface 13 of the flow speed control plate 1 is set to be smaller than the diameter of the clay inflow holes D3 on the clay inflow surface D1 of the die D. Consequently, it is possible to prevent the clay flowing out of the clay flow holes 14 of the flow speed control plate 1 from interfering with the die D. As a result, it is possible to equalize the flow speed of the clay in the die D.

That is to say, the present invention can be applied to the flow speed control plate 1 for use in combination with the die D for forming the monolithic substrate M having a constant cell density as in the fourth embodiment as well as to the flow speed control plates 1 for use in combination with the die D for forming the monolithic substrate M including both the high-cell-density region MH and the low-cell-density region ML as in the first, second and third embodiments.

While the above particular embodiments have been shown and described, it will be understood by those skilled in the art that various modifications, changes, and improvements may be made without departing from the spirit of the present invention. For example, the above-described fourth embodiment may be combined with either or both of the above-described second and third embodiments.

What is claimed is:

1. An apparatus comprising:
a flow speed control plate; and
a die
the flow speed control plate and the die being configured to form a monolith,
the die having both a clay inflow surface on which a plurality of clay inflow holes open and an extrusion surface on which lattice-like grooves open, the lattice-like grooves communicating with the clay inflow holes in the die,
the flow speed control plate comprising:
  a base plate having both a clay supply surface from which a clay is supplied to the flow speed control plate and a clay outflow surface which is configured to be superposed on and thus abut the clay inflow surface of the die and from which the clay flows out of the flow speed control plate;
  a plurality of clay flow holes which each penetrate the base plate in a thickness direction of the base plate and through which the clay flows from the clay supply surface to the clay outflow surface; and
  a positioning mechanism provided to position the flow speed control plate with respect to the die so that each of the clay flow holes of the flow speed control plate has its central axis arranged coaxially with a central axis of a corresponding one of the clay inflow holes of the die, wherein a diameter of the clay flow holes of the flow speed control plate on the clay outflow surface of the base plate is set to be smaller than a diameter of the corresponding clay inflow holes of the die on the clay inflow surface of the die.

2. The apparatus as set forth in claim 1, wherein each of the clay flow holes of the flow speed control plate has a shoulder formed at its opening on the clay supply surface of the base plate so as to taper in from the clay supply surface in the thickness direction of the base plate.

3. The apparatus as set forth in claim 1, wherein the die includes both a low-flow-speed region in which flow speed of the clay is lower than in a high-flow-speed region and the high-flow-speed region in which the flow speed of the clay is higher than in the low-flow-speed region, the flow speed control plate includes both a flow speed control region and a flow speed non-control region which respectively overlap the high-flow-speed region and the low-flow-speed region of the die when the clay outflow surface of the flow speed control plate is superposed on the clay inflow surface of the die, the clay flow holes of the flow speed control plate are formed only in the flow speed control region so that:

in the flow speed control region, the clay flows from the clay supply surface of the flow speed control plate to the high-flow-speed region of the die through the clay flow holes; and in the flow speed non-control region, the clay is supplied from the clay supply surface of the flow speed control plate to the low-flow-speed region of the die without flowing through the clay flow holes.

4. The apparatus as set forth in claim 3, wherein the flow speed non-control region of the flow speed control plate is constituted of a large-diameter hole which penetrates the base plate of the flow speed control plate in the thickness direction thereof and has a larger diameter than the clay flow holes of the flow speed control plate.

5. The apparatus as set forth in claim 3, wherein the clay inflow holes of the die comprise a plurality of first clay inflow holes formed in the low-flow-speed region of the die and a plurality of second clay inflow holes formed in the high-flow-speed region of the die, the lattice-like grooves of the die comprise first lattice-like grooves formed in the low-flow-speed region of the die to communicate with the first clay inflow holes and second lattice-like grooves formed in the high-flow-speed region of the die to communicate with the second clay inflow holes, the second clay inflow holes have a larger diameter than the first clay inflow holes and the second lattice-like grooves have a larger lattice interval than the first lattice-like grooves, and the die also has a tubular groove formed between the first lattice-like grooves and the second lattice-like grooves to open on the extrusion surface of the die.

6. The apparatus as set forth in claim 3, wherein a boundary between the flow speed control region and the flow speed non-control region in the flow speed control plate is formed so that when the clay outflow surface of the flow speed control plate is superposed on the clay inflow surface of the die, none of the clay inflow holes of the die are divided by the boundary and those of the clay inflow holes which are located on the low-flow-speed region side of the boundary are completely exposed to the flow speed non-control region of the flow speed control plate.

7. The apparatus as set forth in claim 6, wherein the boundary between the flow speed control region and the flow speed non-control region is stepped to include a plurality of sections intersecting one another.

8. The apparatus as set forth in claim 6, wherein the lattice-like grooves of the die comprise first lattice-like grooves formed in the low-flow-speed region of the die and second lattice-like grooves formed in the high-flow-speed region of the die, the die also has a tubular groove formed between the first lattice-like grooves and the second lattice-like grooves to open on the extrusion surface of the die, and the boundary between the flow speed control region and the flow speed non-control region in the flow speed control plate is formed so that when the clay outflow surface of the flow speed control plate is superposed on the clay inflow surface of the die, the boundary is located on the low-flow-speed region side of the tubular groove of the die.

9. The apparatus as set forth in claim 6, wherein the lattice-like grooves of the die comprise first lattice-like grooves formed in the low-flow-speed region of the die and second lattice-like grooves formed in the high-flow-speed region of the die, the die also has a tubular groove formed between the first lattice-like grooves and the second lattice-like grooves to open on the extrusion surface of the die, and the boundary between the flow speed control region and the flow speed non-control region in the flow speed control plate is formed so that when the clay outflow surface of the flow speed control plate is superposed on the clay inflow surface of the die, the boundary is located on the high-flow-speed region side of the tubular groove of the die.

10. The apparatus as set forth in claim 6, wherein the lattice-like grooves of the die comprise first lattice-like grooves formed in the low-flow-speed region of the die and second lattice-like grooves formed in the high-flow-speed region of the die, the die also has a tubular groove formed between the first lattice-like grooves and the second lattice-like grooves to open on the extrusion surface of the die, and the boundary between the flow speed control region and the flow speed non-control region in the flow speed control plate is formed so that when the clay outflow surface of the flow speed control plate is superposed on the clay inflow surface of the die, the boundary overlaps the tubular groove of the die in the thickness direction of the base plate of the flow speed control plate.

* * * * *